(12) United States Patent
Peddicord et al.

(10) Patent No.: US 6,814,946 B1
(45) Date of Patent: Nov. 9, 2004

(54) SALT PLATFORM WITH HUB HAVING LOCKING ELEMENT

(75) Inventors: Donald B. Peddicord, P.O. Box 1936, Durant, OK (US) 74702; Michael W. Freitas, North Richland Hills, TX (US); James E. Kilgore, South Lake, TX (US)

(73) Assignee: Donald B. Peddicord, Mead, OK (US)

( * ) Notice: Subject to any disclaimer, the term of this patent is extended or adjusted under 35 U.S.C. 154(b) by 0 days.

(21) Appl. No.: 09/518,624

(22) Filed: Mar. 3, 2000

(51) Int. Cl.⁷ .................................. B01D 11/02
(52) U.S. Cl. .................... 422/275; 108/50; 108/90; 210/190; 422/261; 422/311; 422/902
(58) Field of Search ................ 422/275, 261, 422/311, 902; 108/50, 90; 210/190

(56) References Cited

U.S. PATENT DOCUMENTS

| | | | |
|---|---|---|---|
| 945,989 A | 1/1910 | Sponenbarger | |
| 1,385,903 A | 7/1921 | Cochran | 248/146 |
| 1,932,117 A | 10/1933 | O'Brien et al. | 210/24 |
| 1,986,774 A | 1/1935 | Hopfner | 210/24 |
| 2,192,451 A | 3/1940 | Moore | 210/24 |
| 2,316,526 A | 4/1943 | McDonald | 160/104 |
| 2,657,964 A | 11/1953 | Watrous | 311/105 |
| 2,669,117 A | 2/1954 | Fuhrmann | 72/135 |
| D181,083 S | 9/1957 | Wells | D23/378 |
| 2,829,934 A | 4/1958 | Schulze | 311/35 |
| 2,895,753 A * | 7/1959 | Fentiman | 403/381 |
| 3,082,587 A | 3/1963 | Brimberg | 55/495 |
| 3,374,891 A | 3/1968 | Buchmann | 210/126 |
| 3,432,038 A | 3/1969 | Heskett | 210/96 |
| 3,460,566 A | 8/1969 | Heartstedt et al. | 137/571 |
| 3,502,442 A | 3/1970 | Campbell et al. | 23/272.6 |
| 3,623,978 A | 11/1971 | Boze | 210/54 |
| 3,684,457 A | 8/1972 | Pinto et al. | 210/190 X |
| 3,732,165 A | 5/1973 | Campbell | 210/190 |
| 3,760,753 A | 9/1973 | Mertens | 114/0.5 T |
| 3,787,018 A | 1/1974 | Nathan | 248/188.7 |
| 4,013,556 A | 3/1977 | Evans | 210/291 X |
| 4,235,340 A | 11/1980 | Clack et al. | 206/515 |
| 4,260,487 A | 4/1981 | Gruett | 210/190 |
| D264,694 S | 6/1982 | Takahashi | D21/105 X |
| 4,422,803 A | 12/1983 | Wetmore | 405/204 |
| 4,448,695 A | 5/1984 | Gordon | 210/694 |
| D278,110 S | 3/1985 | Boland, II | D21/108 X |
| 4,623,367 A | 11/1986 | Paulson | 55/385 R |
| 4,718,447 A | 1/1988 | Marshall | 137/268 |
| 4,753,726 A | 6/1988 | Suchanek | 210/291 X |
| 4,764,280 A | 8/1988 | Brown et al. | 210/662 |
| 4,946,600 A | 8/1990 | Shin | 210/758 |
| D316,282 S | 4/1991 | Winston | D21/108 |
| 5,061,219 A * | 10/1991 | Glickman | 446/126 |
| 5,290,004 A | 3/1994 | Frost et al. | 248/528 |
| 5,310,488 A | 5/1994 | Hansen et al. | 210/674 |
| 5,340,485 A | 8/1994 | Bradley et al. | 210/767 |
| 5,411,717 A | 5/1995 | Peddicord et al. | 422/275 |
| D363,971 S | 11/1995 | Peddicord et al. | D23/207 |
| D376,837 S | 12/1996 | Peddicord et al. | D23/207 |
| 5,643,541 A | 7/1997 | Peddicord et al. | 422/275 |
| 5,788,933 A | 8/1998 | Peddicord | 422/275 |
| D408,905 S | 4/1999 | Hadjikyriacou | D23/378 |
| 6,089,941 A * | 7/2000 | Glickman et al. | 446/111 |
| 6,183,704 B1 * | 2/2001 | Peddicord | 422/275 |
| 6,231,416 B1 * | 5/2001 | Clever et al. | 446/108 |
| 6,315,628 B1 * | 11/2001 | Quercetti | 446/128 |
| 6,589,491 B1 * | 7/2003 | Peddicord et al. | 422/275 |

* cited by examiner

Primary Examiner—Krisanne Thornton
(74) Attorney, Agent, or Firm—Thompson & Gustavson, L.L.P.

(57) ABSTRACT

A salt platform (700) is disclosed which incorporates a series of hubs (702), radial braces (704) and curved braces (706) which are snap fit together by use of mating locking members (734) and locking slots (716). The curved braces (706) can be formed with pipe holders to support pipe section (710,712) and pipe elbows (714). A stub spoke (750) can be used if desired.

19 Claims, 25 Drawing Sheets

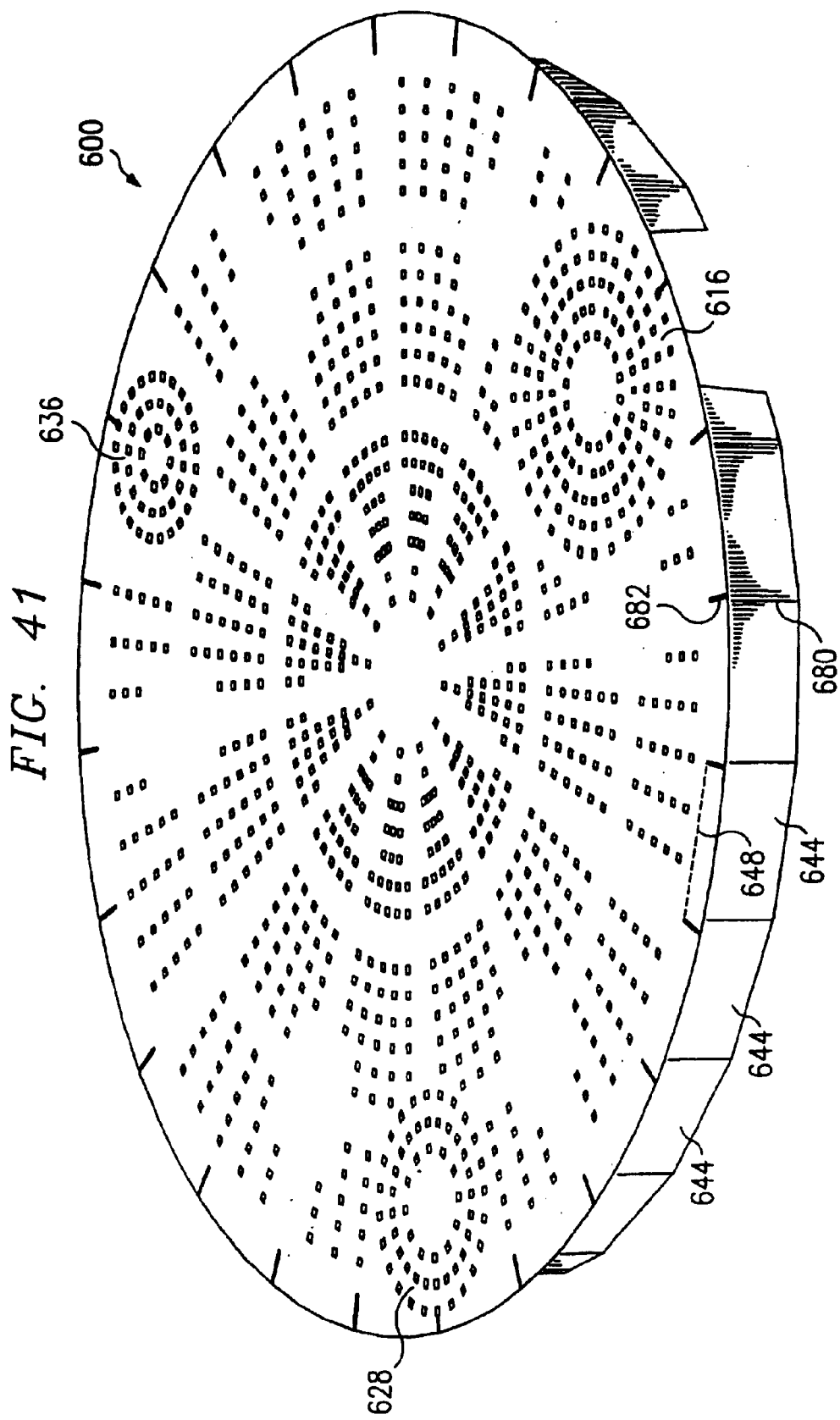

SALT PLATFORM WITH HUB HAVING LOCKING ELEMENT

TECHNICAL FIELD OF THE INVENTION

This invention relates to water softeners using salt, and in particular to a platform for supporting the salt.

BACKGROUND OF THE INVENTION

Water softeners find wide applications throughout society. In many applications, it is desirable to soften the water by removing the hardness minerals from the water before use. This is particularly critical in boiler operation where use of hard water will create boiler scale and rapidly reduce operating efficiencies.

A common water softening process is to use water softeners designed for this purpose. Water softening tanks contain cation exchange resin capable of exchanging hardness ions, i.e., calcium and magnesium for sodium ions which are very soluble.

When the hardness exchanging capacity of the water softening resin has exhausted it stops producing soft water. It then becomes necessary to regenerate the resin with a saturated solution of sodium or potassium chloride. Because of cost, sodium chloride is usually the chemical of choice.

Sodium chloride brine solution is made in a separate tank built and designed for this purpose, and this tank is called a brine tank.

Modern water softeners are well engineered and designed to produce soft water with all regeneration actions done automatically, including the transfer of the saturated brine from the brine tank to the water softener tanks.

In order for the water softener resin to be properly rejuvenated, the saturated brine solution must be of high quality and a measured volume must be delivered whenever needed.

A properly designed and engineered brine tank will provide these needs by delivering a measured quantity of saturated salt brine containing a fixed amount of dissolved salt per gallon of water.

This is accomplished by using a horizontal salt grid in a vertical tank. The height and diameter of the salt grid varies for each softening system, depending on many factors, but in all cases the height of the salt grid sets the volume of water in the brine tank.

In actual practice, the brine system is set to fill the brine tank with fresh water from the bottom of the tank to approximately 1" above the salt grid and then shut off.

Using this method, only 1" of water touches the vertical salt pile, which may be several hundred pounds in weight, stored on top of the salt grid.

This system is called a dry salt shelf system, as opposed to a wet salt brine tank system where most or all the salt is immersed in water. The dry salt shelf system has significant advantages over the wet salt system. The dry salt shelf method produces 100% saturated brine (specific gravity 1.2) all the time where wet salt methods do not. The dry salt shelf system affects more dry salt storage in the same size brine tank than a wet salt system. A dry salt shelf system is easier to keep clean than the wet salt system. A dry salt shelf system does not require a gravel support bed at the bottom of the brine tank. The dry salt shelf system offers lower maintenance costs to the operator, no gravel cleaning or replacement.

The dry salt shelf system has no messy brine float valves as used above the liquid brine on wet salt systems. These float valves become corroded with salt creep and require repair and/or replacement frequently. The dry salt shelf system uses brine float or refill valves in the lower section of the brine tank (below the shelf) and are less exposed to the risk of malfunctions or corrosion, thus operating more efficiently. The dry salt shelf system uses all of the salt stored before the brine tank needs to be refilled. Liquid below the shelf is saturated brine even if only one grain of salt remains on the shelf. The brine tank salt refill is less often with the dry salt shelf system because of the greater salt storage capacity it offers. Brine tank corrosion is reduced or eliminated on steel brine tanks with the dry salt shelf system because the liquid level is down below the dry salt, thus less air/brine exposure. The dry salt shelf system allows more programmed salt delivery scheduling because the salt stored is easily seen and thus the quantity remaining can be easily determined. The dry salt shelf system allows the use of all grades of salt, even the most economical rock type salt. The dry salt shelf type brine system can be cleaned in less than one hour, regardless of size whereas a wet salt tank may take one day and require the water softener to be down.

Dissolving of salt starts immediately and continues until the volume of water beneath the salt grid becomes saturated with dissolved salt. When saturation occurs, dissolving ceases. Stored salt above the salt grid not in contact with the water remains dry, preventing bridging and mushing.

Using a salt grid enables an engineer to calculate the quantity and quality of a particular size brine tank will produce. The engineer then is able to select the proper brine tank for the water softener system. It is imperative that the grid and support system be strong to support the mass of weight placed upon it. Until now, salt grids and support systems have usually been made from pegboard. It is readily available and cheap; however, in contact with the salt brine it tends to deform, warp and those portions of the salt grid left unsupported tend to break and collapse, dumping the salt stored on them down into the brine measuring area When this occurs, it causes the water softener to malfunction.

The salt grid and support system must be rebuilt, and in time it fails again.

For these reasons, the salt grid and support system could not be used in larger brine tanks.

As the demand increased for larger and larger water softeners, the demand for more saturated brine increased.

In order to provide this requirement, brine tanks increased in size and the pegboard salt grid and support system could not be used as they were not strong enough to hold the weight.

These larger systems were forced to use the less efficient older method of wet storage.

This method consists of loading the brine tank with several hundred pounds of gravel on the bottom. Several hundred pounds of salt is then poured upon the gravel and then adding water until a portion or all of the salt is submerged.

The measuring advantage of the salt grid system is lost.

The salt brine produced by the wet salt storage method is often of poor quality and submerged salt tends to bridge and mush, causing maintenance problems.

The salt Grid plate and support system disclosed herein is strong enough that it may be used in the larger systems.

Again, the engineer can calculate the exact quantity of brine needed by utilizing the salt grid method.

SUMMARY OF THE INVENTION

In accordance with one aspect of the present invention, a salt platform is provided which includes at least one hub, the hub having a locking element. In accordance with another aspect of the invention, the salt platform further includes a radial brace having at least one end with an locking element to engage the locking element on the hub to secure the radial brace and hub together. In a further feature, the salt platform can include a curved brace having locking elements to secure the curved brace to the hub.

BRIEF DESCRIPTION OF THE DRAWINGS

For a more complete understanding of the present invention and the advantages thereof, reference is now made to the following description taken in conjunction with the accompanying drawings, in which:

FIG. 41 is a perspective top view of the salt grid of FIG. 36;

DETAILED DESCRIPTION

Figure 1:
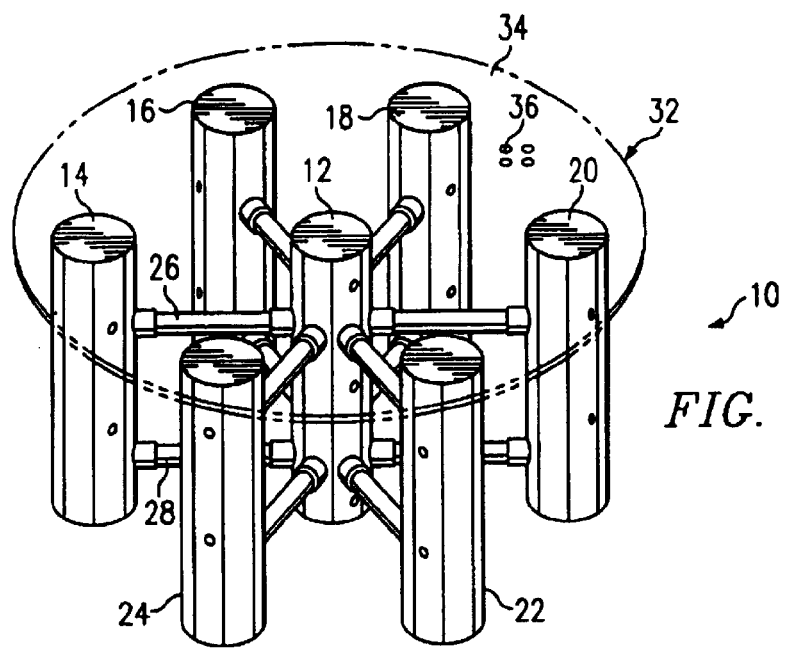
FIG. 1 is a perspective view of a salt platform forming a first embodiment of the present invention.
Figures 2, 3:
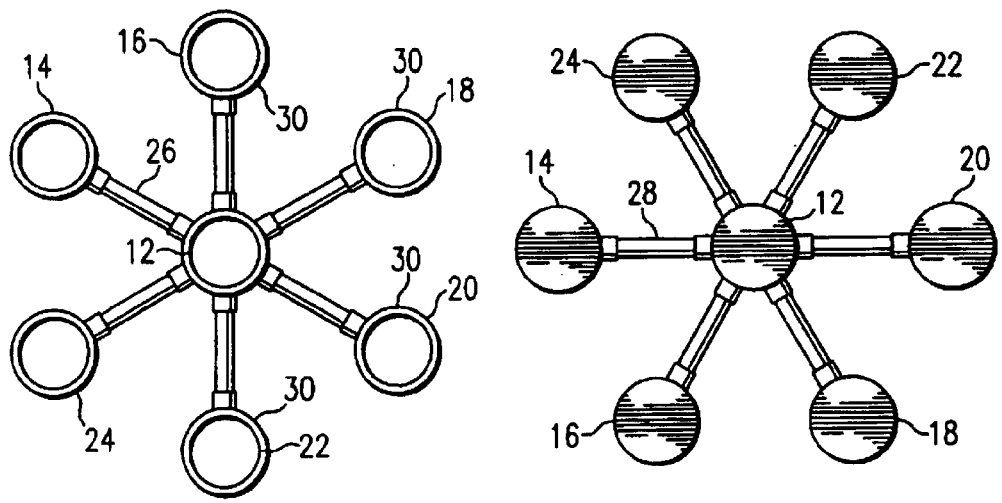
FIG. 2 is a top view of the salt platform.
FIG. 3 is a bottom view of the salt platform.
Figures 4, 5:
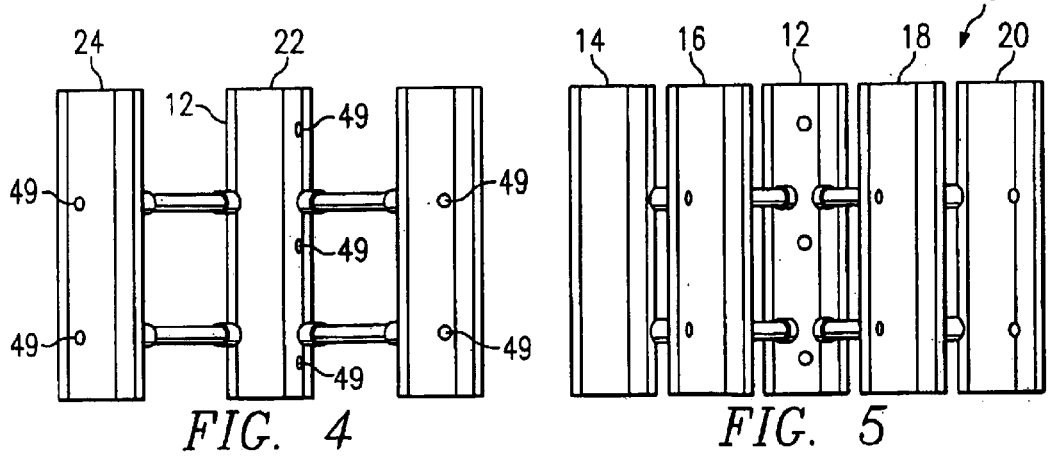
FIG. 4 is a side view of the salt platform.
FIG. 5 is another side view of the salt platform taken from an angle different than FIG. 4.
Figure 6:
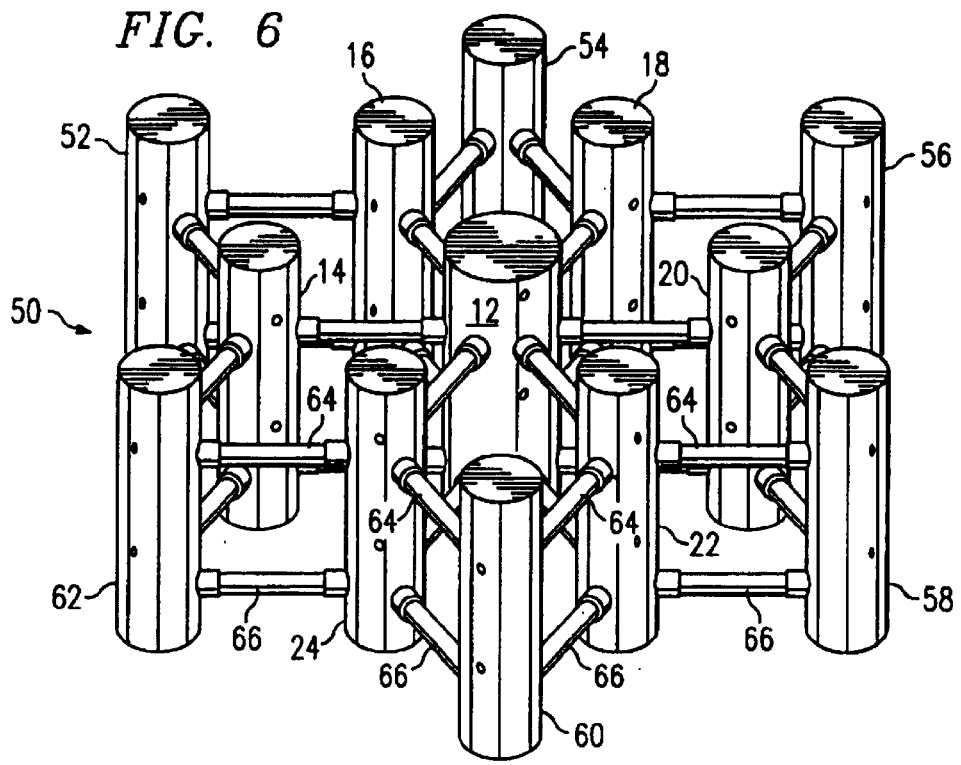
FIG. 6 is a perspective view of a salt platform forming a second embodiment of the present invention.
Figure 7:
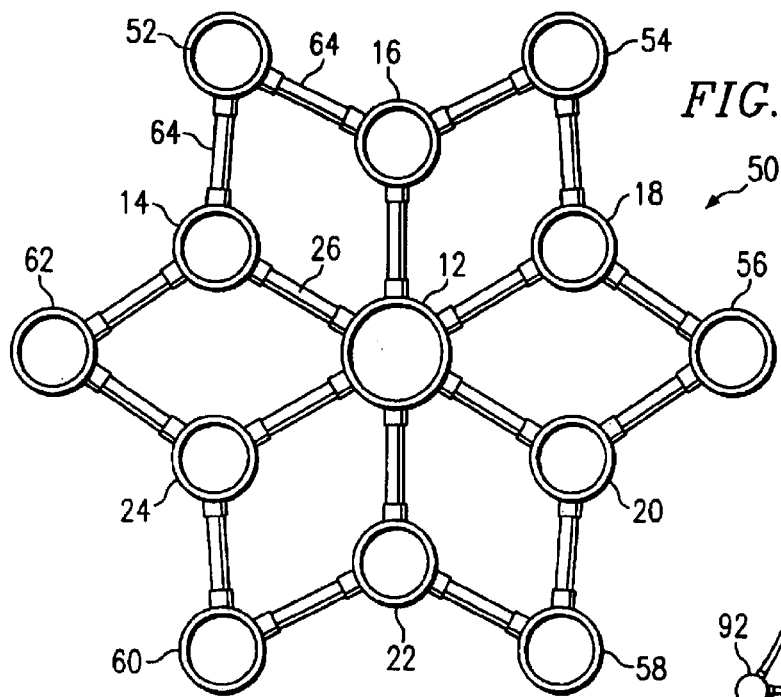
FIG. 7 is a top view of the salt platform of FIG. 6.

With reference now to the accompanying drawings, wherein like or corresponding parts are designated by the same reference numeral, and with specific reference to FIGS. 1–5, a salt platform 10 is disclosed which forms a first embodiment of the present invention. The platform will be positioned within a tank containing salt which forms part of a water softener. Frequently, the tank is a stand alone unit which contains only the salt and the platform. Water is then circulated through the tank where sodium chloride is dissolved to substitute for the minerals in the water.

The salt platform 10 can be seen to include a central vertically oriented cylinder 12 and a series of radial vertically oriented cylinders 14–24. Each of the radially oriented cylinders is attached to the central cylinder by a pair of horizontal bracing members 26 and 28. In the preferred embodiment, the cylinders and bracing members are formed of PVC plastic. The cylinder 12 can be six inches in diameter and the cylinders 14–24 four inches in diameter. The bracing members are preferably glued to the cylinders with a commonly available PVC glue such as used in plumbing to join PVC pipe sections together.

The upper end 30 of each of the cylinders can be seen to lie in a common plane 32. A grid 34 is preferably supported on the upper ends of each of the cylinders which, in turn, is in direct contact with the salt supported by the platform. Preferably the grid 34 has a plurality of apertures 36 formed therethrough for easy passage of the water through the salt. In the preferred embodiment, the grid is made out of ABS plastic and is one-quarter inch thick. The grid is cut to a diameter slightly less than the diameter of the tank in which the platform is used. A sufficient number of apertures are then formed through the grid to provide the necessary path for water flow. The apertures can be ⅛ or ¼", for example. In one technique, a common sheet of perforated peg board can be laid on top of the grid and used as a pattern to drill the holes through the grid. Clearly, the grid can be molded with the holes in place if this is more economical.

By using a plurality of vertically oriented cylinders, interconnected by bracing members, the load of salt is uniformly supported. It is common for water softeners to employ hundreds of pounds of salt and the platform must be sufficiently strong to support this weight. Because a plurality of vertically oriented members are used, the invention works well regardless of the specific platform height or width that is used. In order to uniformly support the entire weight bearing surface of the salt grid, all of the area which is beneath the salt grid to the bottom of the tank and the sidewall to sidewall is used to support the grid by suitable placement of the vertically oriented members and the horizontal bracing members. The salt platform can be used in tanks having a diameter range of between 18" and 72", for example. Moreover, the tanks need not be cylindrical, but can have a square or other cross-section.

Each of the vertically oriented cylinders has a series of holes 49 formed through the wall of the cylinders distributed along its length. These holes 49 allow water to fill the interior of the cylinders relatively early in the filling of the tank so that the platform will not lift or shift position due to buoyancy. Similarly, the holes will permit water to drain from the cylinders as the tank is drained. The hole can be ½" diameter, for example.

With reference now to FIGS. 6–10, a second embodiment of the present invention is illustrated as salt platform 50. A number of elements of salt platform 50 are identical to that of salt platform 10 and are identified by the same reference numeral. However, in salt platform 50, a second set of radial vertically oriented cylinders 52–62 are distributed at uniform radial distances from the central cylinder 12. Bracing members 64 and 66 are used to secure each of the cylinders 52–62 to two of the adjacent radial cylinders 14–24.

Figure 11:
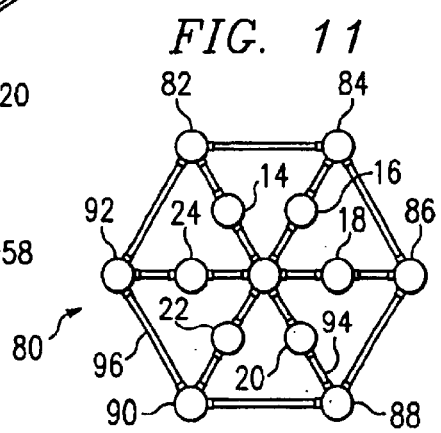
FIG. 11 is a schematic view of a third embodiment of the present invention.
Figure 8:
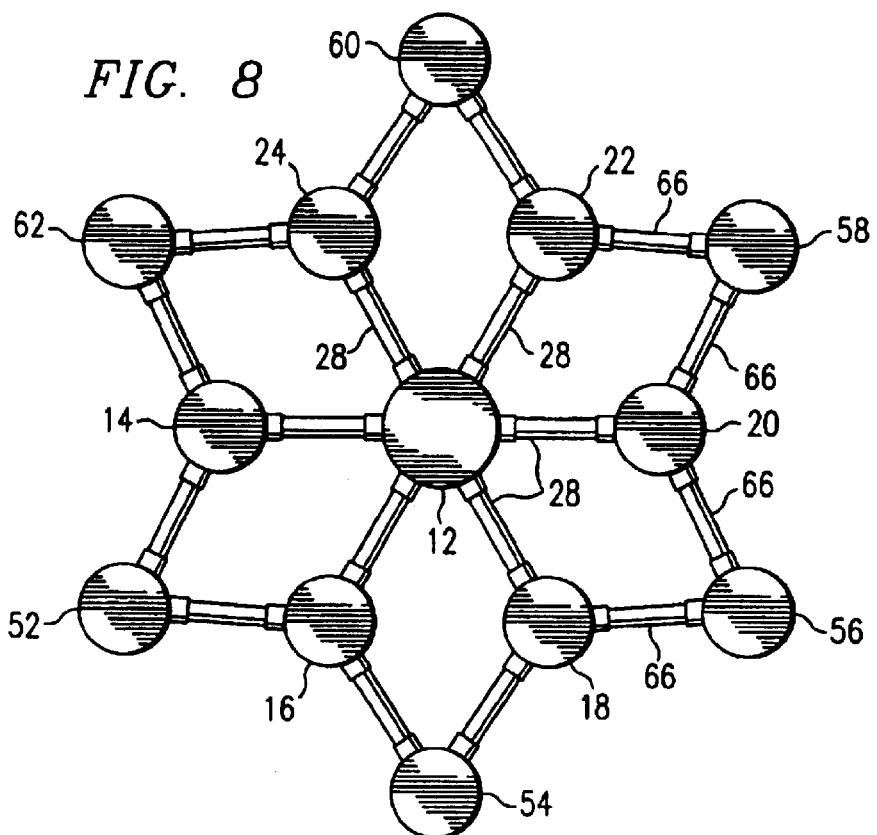
FIG. 8 is a bottom view of the salt platform of FIG. 6.
Figure 9:
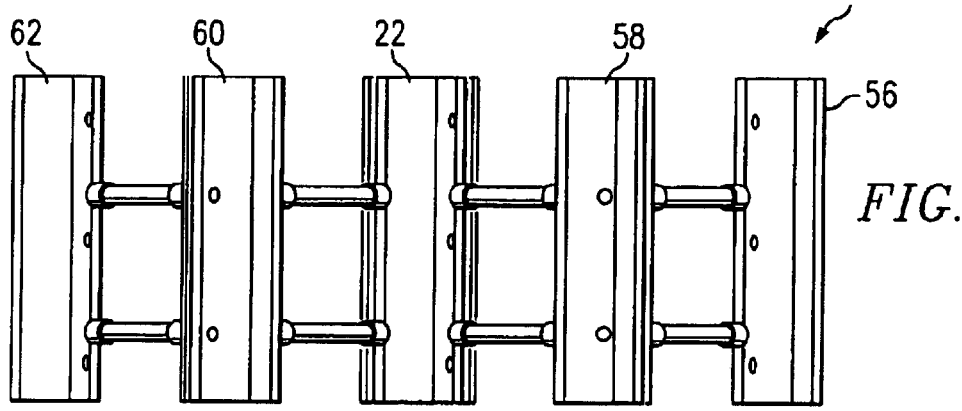
FIG. 9 is a side view of the salt platform of FIG. 6.
Figure 10:
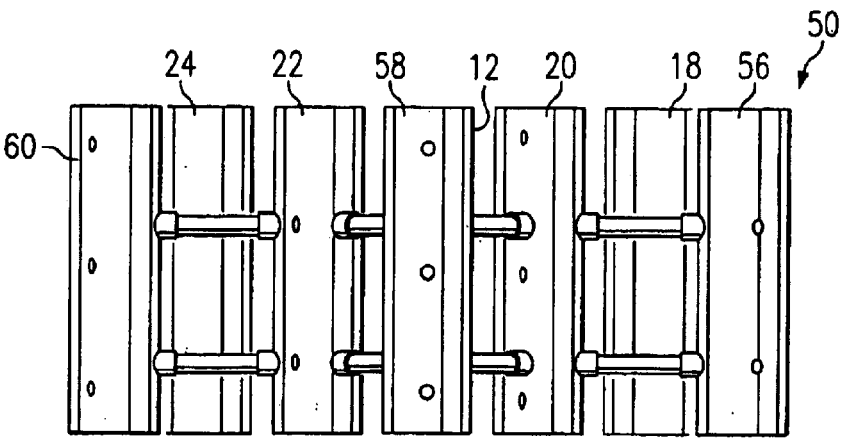
FIG. 10 is another side view of the salt platform of FIG. 6 taken from an angle different than FIG. 9.

With reference to FIG. 11, a third embodiment of the present invention is illustrated and forms salt platform 80. Again, a number of elements of salt platform 80 are identical to that of salt platform 10 and are identified by the same reference numeral. Salt platform 80 is provided with a second set of radial vertically oriented cylinders 82–92 which are spaced on the same radial lines as the cylinders 14–24. Each of the cylinders 82–92 are connected to adjacent cylinders by radial bracing members 94 and circumferential bracing members 96.

Figure 12:
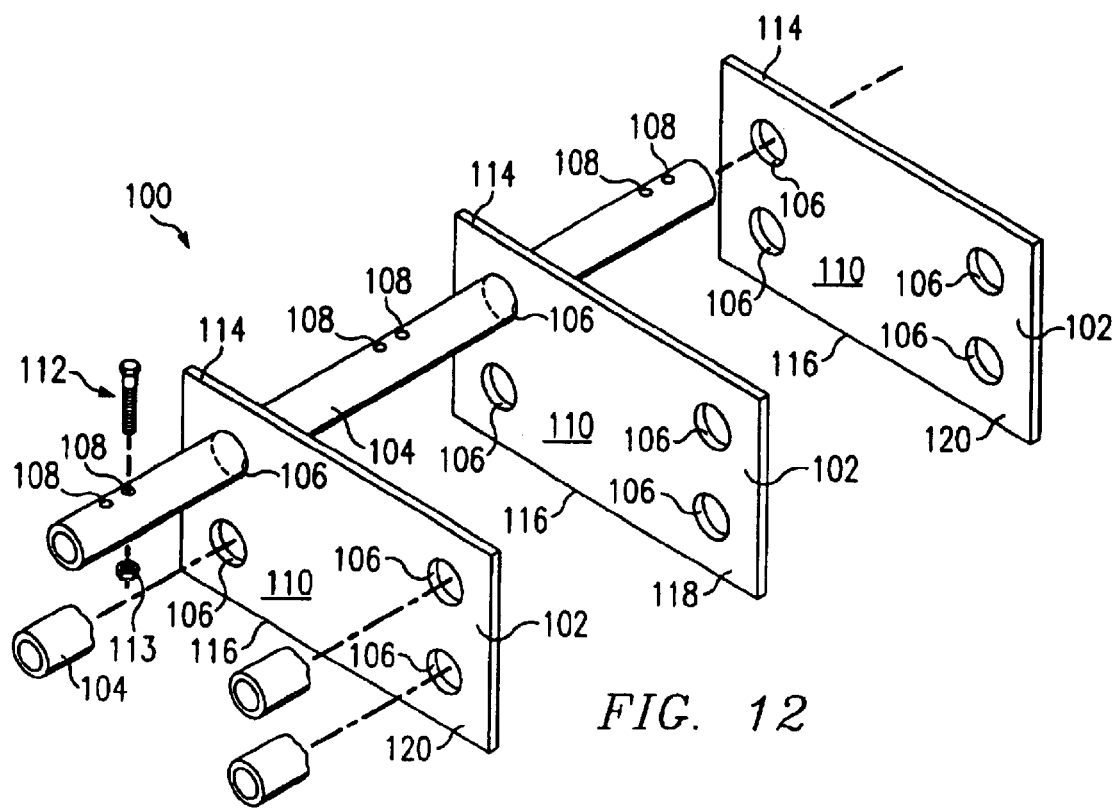
FIG. 12 is a perspective view of a fourth embodiment of the present invention.
Figure 13:
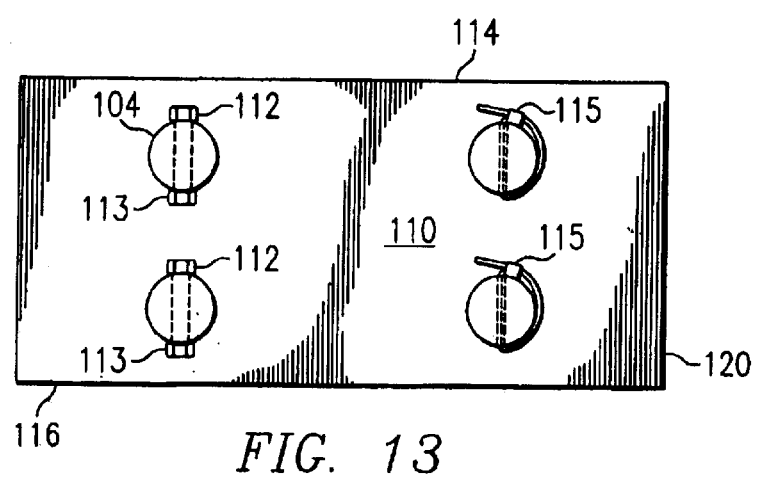
FIG. 13 is a side view of the embodiment of FIG. 12.
Figure 14:
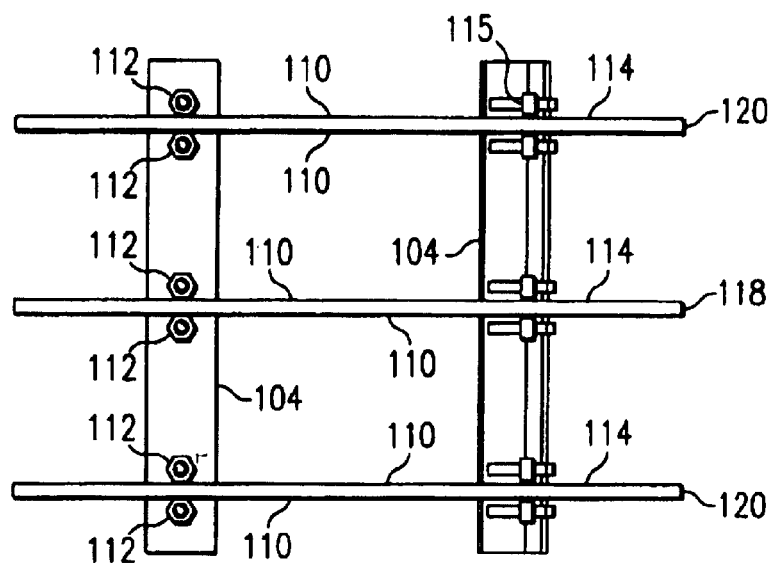
FIG. 14 is a top view of the embodiment of FIG. 12.

With reference now to FIGS. 12–14, a fourth embodiment of the present invention is illustrated as salt platform 100. Salt platform 100 can be seen to include a series of vertically oriented sheets 102, preferably formed of ABS plastic. The sheets are connected together in a spaced apart relation by a series of horizontal tubes 104, preferably formed of PVC pipe. The tubes 104 pass through suitably formed apertures 106 in the sheets. Holes 108 are formed through the tubes 104 immediately adjacent the surfaces 110 of the sheets to hold the platform together. A bolt 112 or other suitable fastener can be passed through each of the holes and secured therein, as by nut 113 so that the tube is locked in place relative to the sheets. Alternatively, fasteners such as plastic wire ties 115 can be passed through the holes to act in a similar manner. Other suitable fasteners would include clips, pegs, pins, and the like.

The salt platform 100 is positioned within the water softener with the upper edges 114 of the sheets 102 supporting the salt platform. The lower edges 116 rest on the bottom of the water softener tank.

As can be understood, the sheets can be any suitable length to fit the particular tank used. For example, the middle sheet 118 may be longer than the end sheets 120 if the tank is circular. Further, the lower edges 116 of the sheets can be curved in any desired configuration to better fit the contour of the water softener tank. Any number of sheets can be placed side by side by simply lengthening the tubes 104 and providing suitable mounting holes adjacent the position of each sheet.

As can be readily understood, a key part of the invention is the ability to distribute the salt load through a plurality of vertically oriented members distributed relatively uniformly underneath the salt grid. The members need not the circular, however, PVC pipe is commonly available and is inexpensive and forms a very effective member for use in this application. The use of PVC and ABS plastic have the advantage of being very inert to brine and would be expected to have very long service life in this application. However, any other material can be used to form the platform and grid which are strong enough and inert to the brine solution. An example of suitable materials include, but is not limited to, acrylics, plexiglass, fiberglass, polyethylene, polypropylene, polycarbonate, NORYL®, KEVLAR® and metal structures made impervious to the brine solution by resin or asphalt type coatings.

Figure 15:
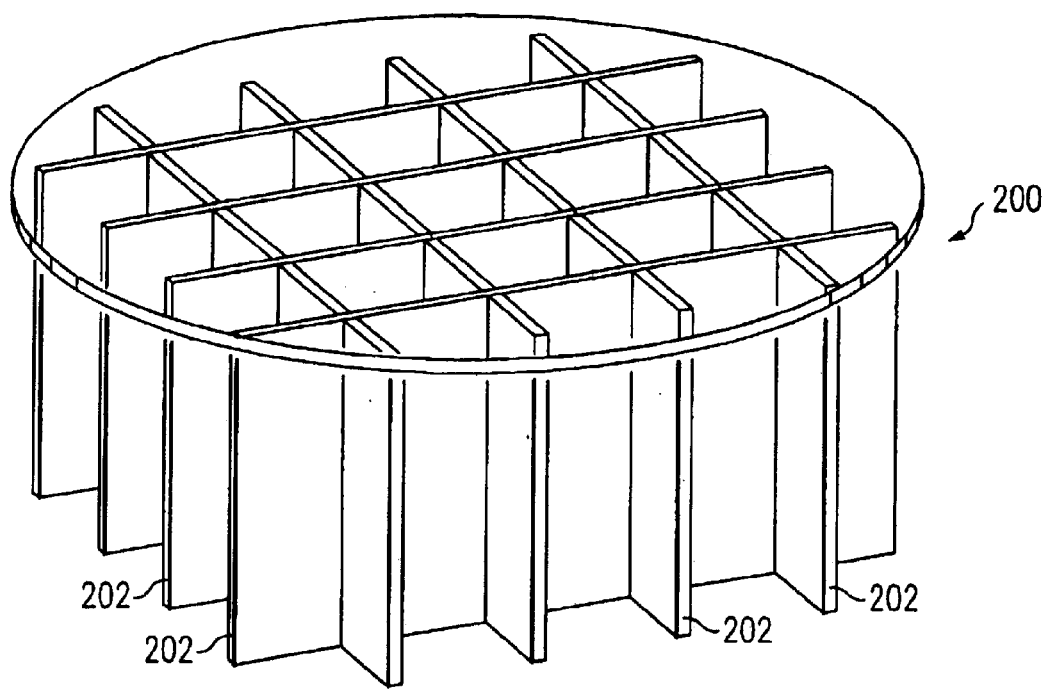
FIG. 15 is a perspective view of a fifth embodiment of the present invention with slotted sheets.
Figure 16:
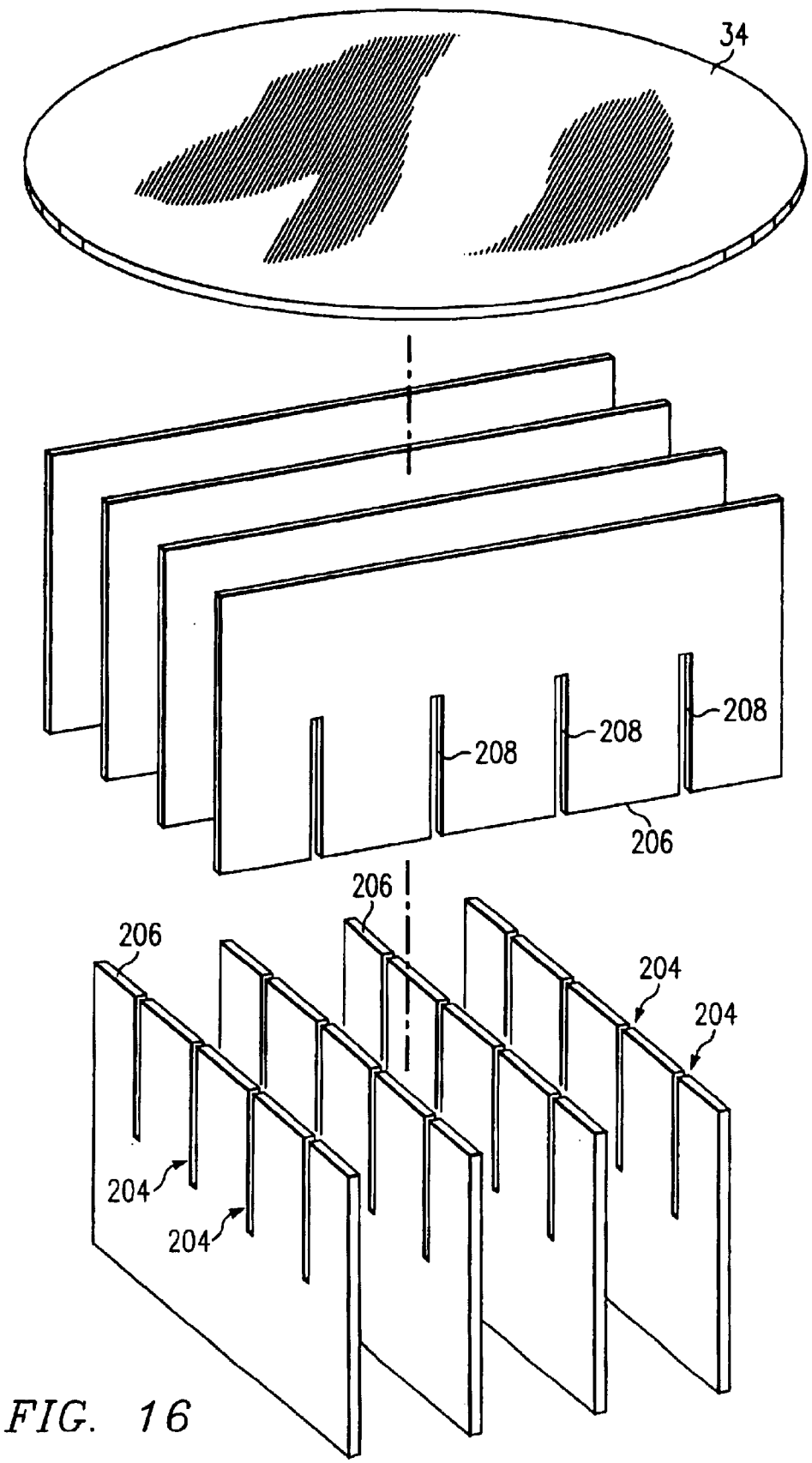
FIG. 16 is an exploded view of the embodiment of FIG. 15.

With reference now to FIGS. 15 and 16, a fifth embodiment of the present invention is illustrated as salt platform 200. Salt platform 200 can be seen to include a series of vertically oriented sheets 202, preferably formed of ABS plastic. Each sheet has a series of slots 204 formed into the sheet from one edge 206. As can be seen in FIG. 16, the sheets can be mated to each other, with the slots of one sheet mating with the slots of another sheet, to form a rigid, self-standing platform, as seen in FIG. 15. Preferably, the slots extend somewhat over one-half of the way from edge 206 to the opposite edges so that, when the sheets are mated, the top edges of the sheets lie in the same plane to uniformly support the grid 34. Also, the bottom edges of the sheets should lie in the same plane if the bottom of the tank is flat to uniformly distribute the load along the bottom of the tank.

While eight sheets are shown in FIGS. 15 and 16, it is clear that any number of sheets can be used. For example, two sheets can be interconnected to form a platform Three sheets can be mated in a triangular form to form a platform and four or more sheets can be mated to form various configurations. As will be clearly understood, the edges 208 of the slots engage the surface of the mating sheet to form a rigid construction without the use of any fasteners whatsoever.

Figure 17:
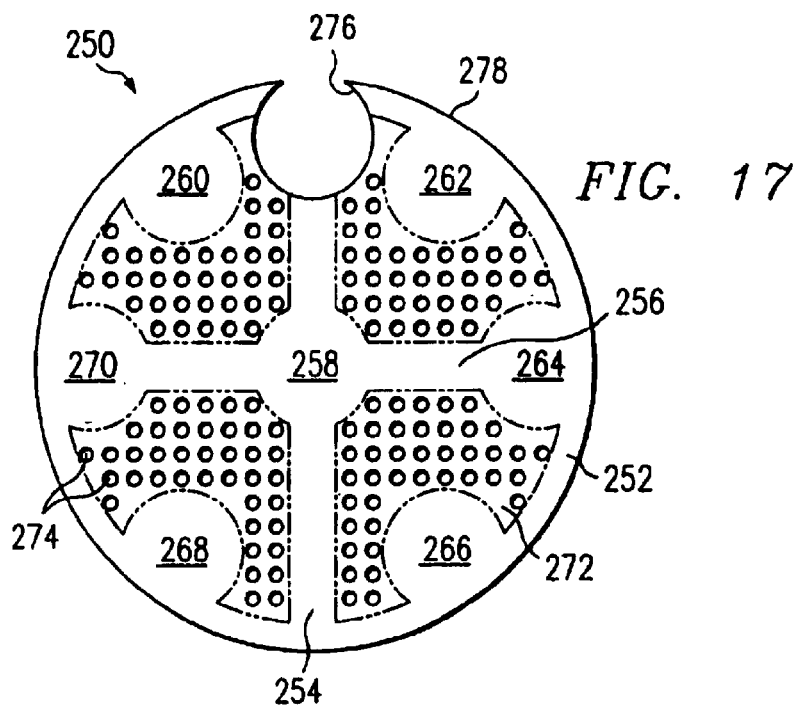
FIG. 17 is a plan view of an improved salt grid for use with the salt platform of the present invention.

With reference now to FIG. 17, a grid 250 is illustrated which is intended to form part of the salt platform 10 described previously. The grid is preferably formed of ABS plastic, having a thickness of ⅛ or ¼ inch. The typical pegboard used in previous salt platforms is usually available only in sheets of 4 foot by 8 foot, limiting the size of the grid formed thereby to a 4 foot diameter. ABS plastic sheet is available up to 10 feet square and grids can therefore be made larger than previous designs using peg board. The ABS plastic is much stronger than peg board and is inert in the salt water brine found in brine tanks.

The grid 250 has a circular shape and defines a border portion 252, a first band 254 and a second band 256. The grid also defines a central cap portion 258 and a series of radial cap portions 260–270. The remaining portion 272 of the grid has a plurality of small holes 274 drilled therethrough for water to pass and mix with salt supported on the grid.

The grid 250 is designed to be set atop the central vertically oriented cylinder 12 and the radial vertically oriented cylinders 14–24. The upper ends 30 of each of the cylinders need not be closed off as the grid 250 is oriented relative to the cylinders 12–24 so that the central cap portion 258 rests atop the upper end of the central vertically oriented cylinder 12 and each of the radial cap portions 260–270 rest atop one of the radial vertically oriented cylinders 1424. Thus, the labor necessary in individually installing a cap at the upper end of each of the cylinders is eliminated. By capping the cylinders 12–24, debris is prevented from entering the interior of the cylinders.

The use of a border portion 252, which, for a grid having a 50 inch diameter, might be 2 inches wide, and the bands 254 and 256, which, for a 50 inch diameter grid may be about 4 inches in width, provides great structural strength even though the portion 272 is formed with a plurality of holes therein.

To correspond with the dimensions previously recited for the cylinders 12–24, the radial cap portion 258 will be at least 6 inches in diameter if cylinder 12 is 6 inches in diameter and the radial cap portions 260–270 will be at least 4 inches in diameter if the cylinders 14–24 are 4 inches in diameter. Grid 250 is intended to be a direct substitute for the grid 34 previously described.

The grid 250 has a well opening 276 formed therethrough near the circumferential edge 278 thereof. Clearly, the grid 250 can be adapted for use with the salt platform 50 or salt platform 80 described above with sufficient cap portions to fit over the upper ends of the vertical cylinders thereof.

If desired, the grid 250 can be formed with the entire grid being like portion 272 with holes 274 formed uniformly therethrough about the entire grid. This might be a suitable universal design for use in salt platforms of types other than those described above.

Figure 18:
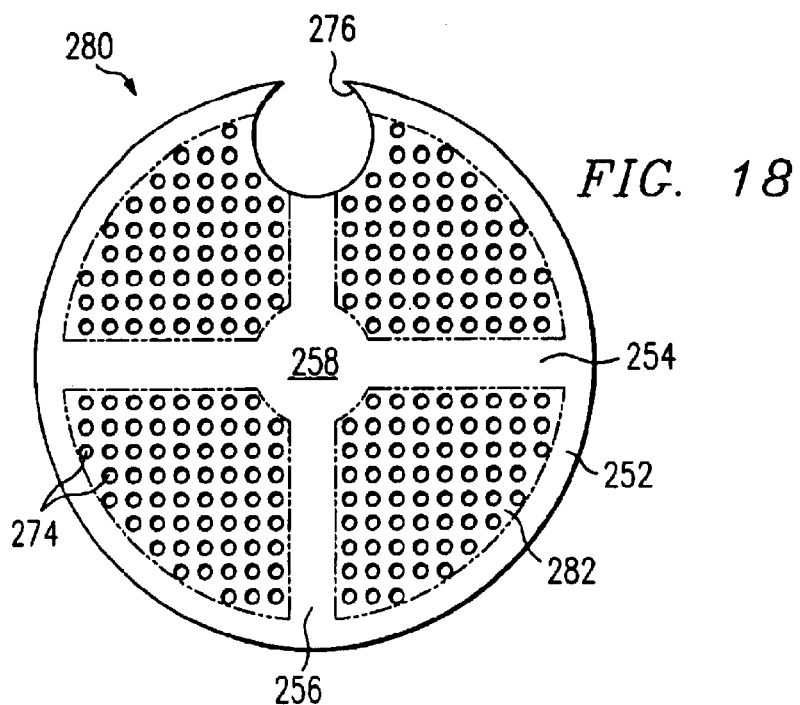
FIG. 18 is a plan view of an improved salt grid for use with the salt platform forming the first embodiment of the present invention.

Alternatively, a grid 280 of the type shown in FIG. 18 can be used. Grid 18 incorporates border portion 252 and first and second bands 254 and 256, central cap portion 258 and the well opening 276. However, no radial cap portions are provided and the remaining portion 282 between the bands 254 and 256 and portions 252 and 258 are formed with uniformly distributed holes 274 therein. Again, the use of portions 252 and 258 and bands 254 and 256 provide great strength to the grid while sufficient holes 274 are formed through the grid for it to work effectively in the brine tank.

The well opening typically will be about 3½ inches to 6¼ inches. Grids are typically cut for new tanks to fit. Large brine tanks have a variance in diameter and it is best to fit the grid at the shop to give a snug fit as the tank diameter varies slightly from tank to tank. Retrofitting grids in existing large or brine tanks that have been in service for some time may dictate cutting the grid to dimensions less than that to which the brine tank was originally designed as time and service may have caused the tanks to be warped out of round.

Using grids of the type described herein, forming a grid for a brine tank having a diameter of 50 inches or larger is possible. This size tank has never been able to be fitted with a grid formed of peg board in the past because of size limitations in the material available. Because of variation in tank size, the border portion 252 is useful, permitting portions of the border to be cut away to fit a particular tank without cutting through any of the holes 274 formed in the grid.

Figure 19:
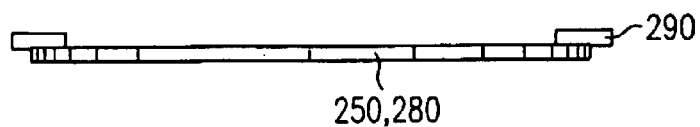
FIG. 19 is a side view of the improved salt grid.

Another variation is to form a spacer ring 290 of a diameter somewhat larger than the diameter of the grid and an inner diameter somewhat smaller than the inner diameter of the border portion 252. The grid 250 or 280 is then cut to a diameter somewhat less than the diameter of the tank and the spacer ring is inserted in the tank on top of the grid with the outer diameter of the spacer ring approximating the diameter of the brine tank. The spacer ring can move about somewhat on the top of the grid 250 or 280 and then be secured to the grid by fasteners, such as wire ties, to prevent salt from slipping between the grid edges and the wall of the brine tank Such a spacer ring 290 is illustrated in FIG. 19.

Figure 20:
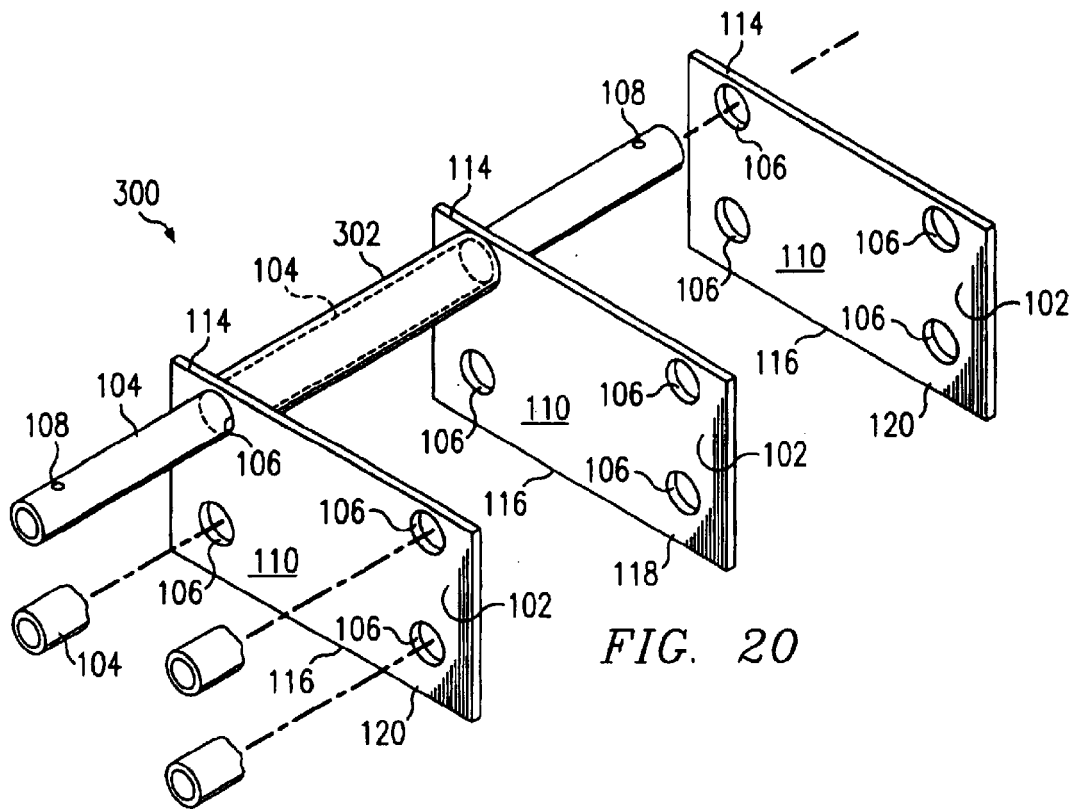
FIG. 20 is a perspective view of a modification of the fourth embodiment of the present invention.
Figure 22:
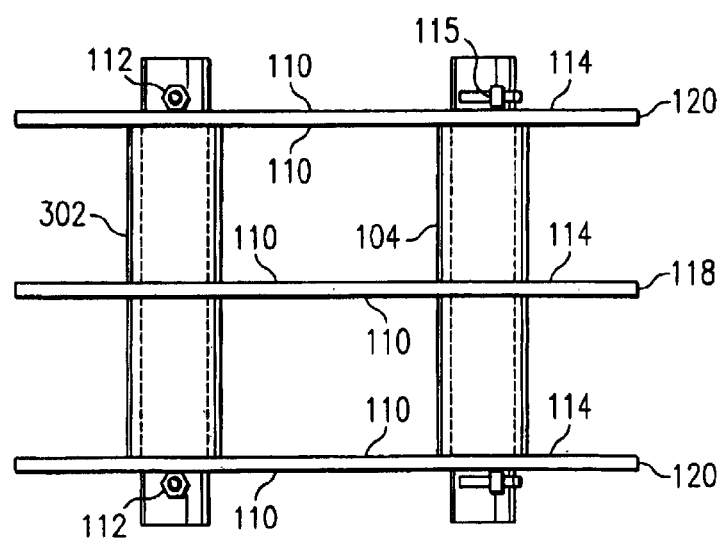
FIG. 22 is a plan view of the embodiment of FIG. 20.
Figure 21:
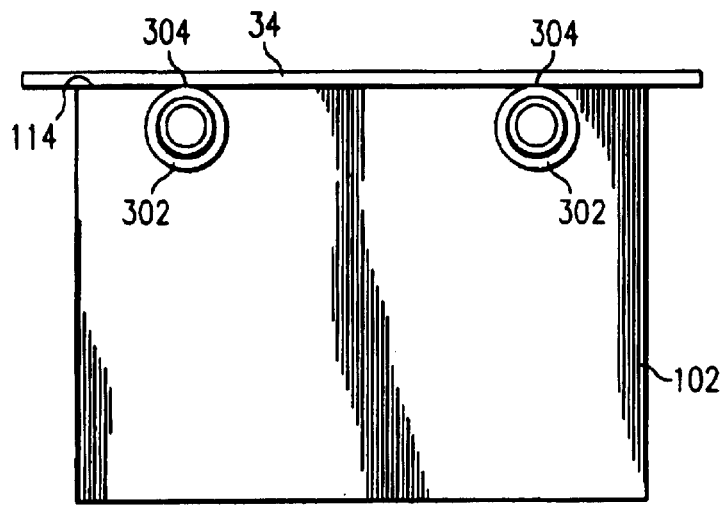
FIG. 21 is a vertical cross-sectional view of the embodiment of FIG. 20 taken along line 21—21 in FIG. 20.

With reference now to FIGS. 20–22, a modification of the fourth embodiment of the present invention is illustrated as salt platform 300. Many elements of salt platform 300 are identical to that of salt platform 100 and are identified by the same reference numeral. Salt platform 300 differs from platform 100 in the use of spacer tubes 302 which are slid over and concentric with the tubes 104 between each of the sheets 102. This eliminates the need to have bolts or ties except at the ends of the tubes 104. The length of the spacer tubes 302 is selected to represent the desired separation between each of the sheets 102 and, when the salt platform is assembled and bolts or ties 112 or 115 are inserted through the holes 108 at the ends of each of the tubes 104, the sheets 102 are held in the proper spacing by the spacer tubes 302. The spacer tubes 302 have a larger diameter than the apertures 106 formed through the sheets 102 and have a sufficiently large inner diameter to fit over the tubes 104, preferably in a slip fit.

As illustrated in FIG. 21, the use of the spacer tubes 302 also provides an additional advantage with the top row of tubes 104. The apertures 106 near the upper edge 114 of each of the sheets 102 are formed sufficiently close to the edge so that the upper surface 304 of the spacer tubes 302 proximate the upper edge are substantially coplanar with the edges 114. This provides additional support for the grid 34 laid atop the salt platform. Preferably, the apertures 106 in the top row are formed through the sheets 102 with the distance from the upper edge of each aperture to the upper edge 114 equal to the thickness of the spacer tube 302.

The parts of salt platform 300, particularly spacer tubes 302, can be made of PVC plastic. However, other materials can be used, including, but not limited to, acrylics, plexiglass, fiberglass, polyethylene, polypropylene, polycarbonate, NORYL®, KEVLAR® and metal structures made impervious to the brine solution by resin or asphalt type coatings.

Figure 23:
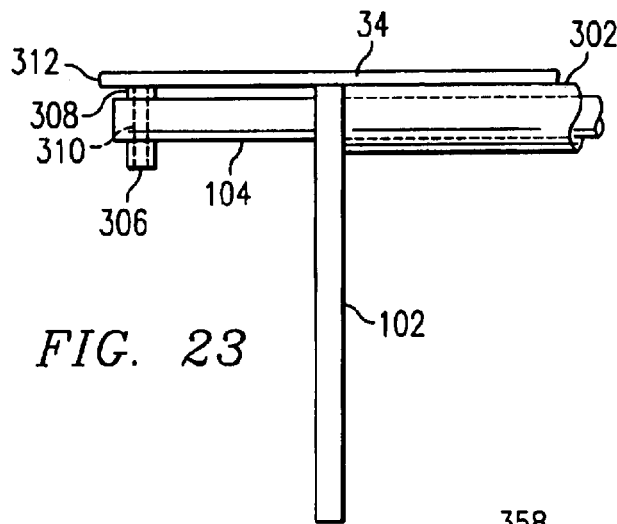
FIG. 23 is a detail view of the additional support for the salt grid.

An additional feature of salt platform 300 is shown in FIG. 23. A hole 310 is formed at the end of the top row of tubes which project a significant distance beyond the outer most sheets 102. This includes the tubes 104 passing through the center portion of the sheets 102 where there is a large distance from the outermost sheets 102 to the inner surface of the brine tank. The salt grid 34 is only supported by the sheets 102 and the spacer tubes 302 between the sheets, not outside the limits of the sheets 102. These holes 108 can receive a bolt 306 which has a head 308 of thickness sufficient so that the grid 34 is in contact with the head 308 of the bolt 306, which provides support for the salt grid 34 near its edges 312 most distant from the sheets 102. Bolt 306 can be of PVC, or other suitable material as noted above.

In one embodiment constructed in accordance with the teachings of the present invention, the head of the nut is about one-eighth inch thick and the distance from the top of the apertures 106 to the upper edges 114 is about one-eighth inch. The wall thickness of tubes 302 is also about one-quarter inch.

Figure 24:
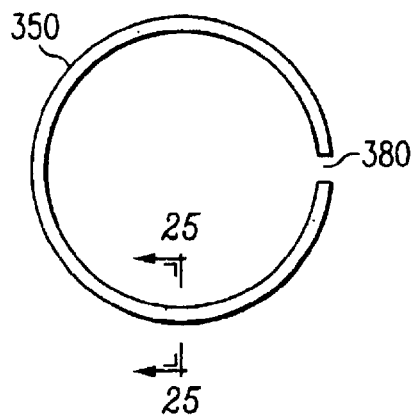
FIG. 24 is a plan view of a salt grid ring.
Figure 25:
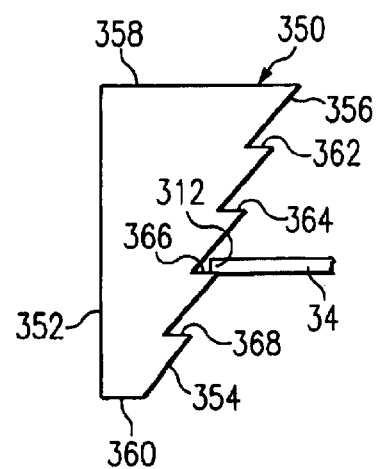
FIG. 25 is a vertical cross-sectional view of the ring taken along line 25—25 in FIG. 24.

With reference now to FIGS. 24 and 25, a ring 350 is illustrated which is used to fit the salt grid 34 in a brine tank. The ring is split therethrough at split 380 similar to a piston ring to allow the outer circumference of the ring to vary somewhat. The ring is made of a material which provides some flexibility, such as neoprene. The brine tanks in service rarely are perfectly round. Therefore, if the salt grid is formed as a circle, there will often be gaps between the edge 312 of the salt grid and the inner wall of the brine tank due to this irregularity, allowing salt to fall through these gaps. The ring 350 is designed to accommodate this variation in brine tank wall dimensions. The ring 350 has an outer surface 352 which engages the inner wall of the brine tank. The ring 350 has an inner surface 354 which is formed in a series of cut back steps 356 which causes the top surface 358 of the ring to be much larger than the bottom surface 360. These steps 356 form a series of ledges 362, 364, 366 and 368 which can each support the edge 312 of the salt grid 34 depending upon the size of the gap between the edge of the salt grid and the interior surface of the brine tank. During installation, the ring 350 is wrapped or fit about the edge of the salt grid so that the edge rests on one of the ledges 362–368. An effort is then made to place the ring 350 and salt grid 354 within the brine tank If the fit is too tight, the ring is repositioned on the salt grid on a lower ledge until the ring 350 and salt grid 34 fit properly in the brine tank. If there is too much of a gap still between the outer surface 352 of the ring 350 and the inner wall of the brine tank, the ring 350 is repositioned on the salt grid with the edge of the salt grid at a higher ledge. When the ring 350 is properly positioned on the salt grid 34, there should be a snug fit between the salt grid, ring 350 and inner surface of the brine tank which prevents salt on the salt grid from inadvertently falling between the edge of the salt grid and the inner surface of the brine tank, as well as acting to true the diameter of the brine tank to some extent.

Ring 350 can also be made of PVC or ABS plastic. However, other materials can be used, including, but not limited to, acrylics, plexiglass, fiberglass, polyethylene, polypropylene, polycarbonate, NORYL®, KEVLAR® and metal structures made impervious to the brine solution by resin or asphalt type coatings.

Figure 26:
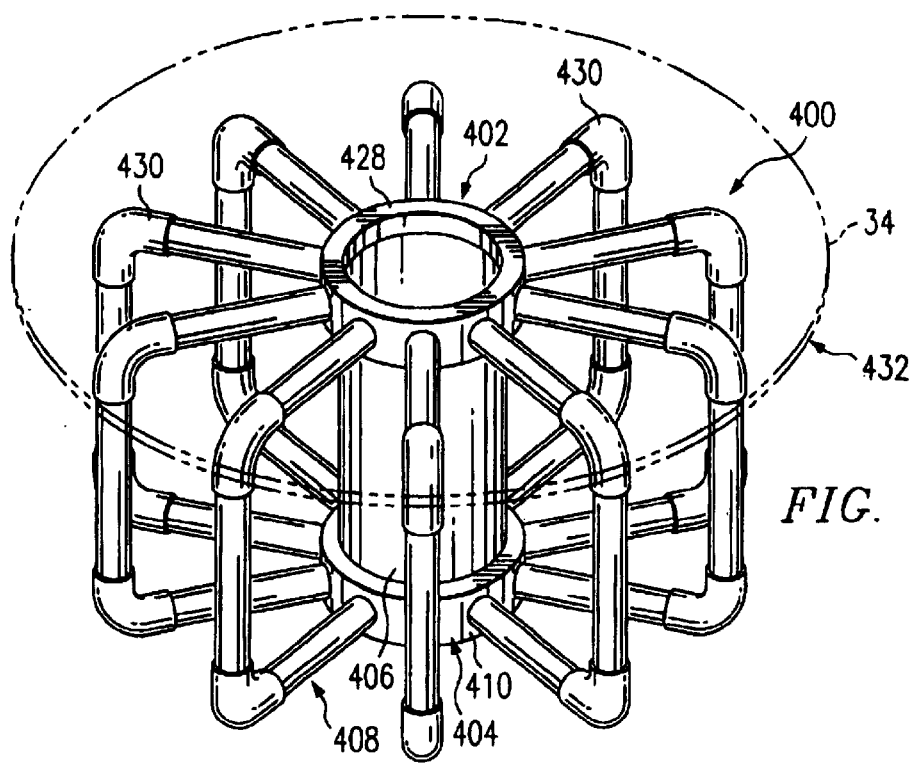
FIG. 26 is a perspective view of a sixth embodiment of the present invention.

With reference now to FIGS. 26–29, a sixth embodiment of the present invention will be described which is embodied by salt platform 400. As seen in FIG. 26, the salt platform 400 includes a top member 402 and a bottom member 404 spaced apart by a spacing member 406. A plurality of bracing member assemblies 408 extend radially outward from the members 402, 404 and 406 to further define the salt platform 400. Any of the grids previously mentioned, including grids 34, 250 and 280, can be used on salt platform 400, as desired.

Figure 28:
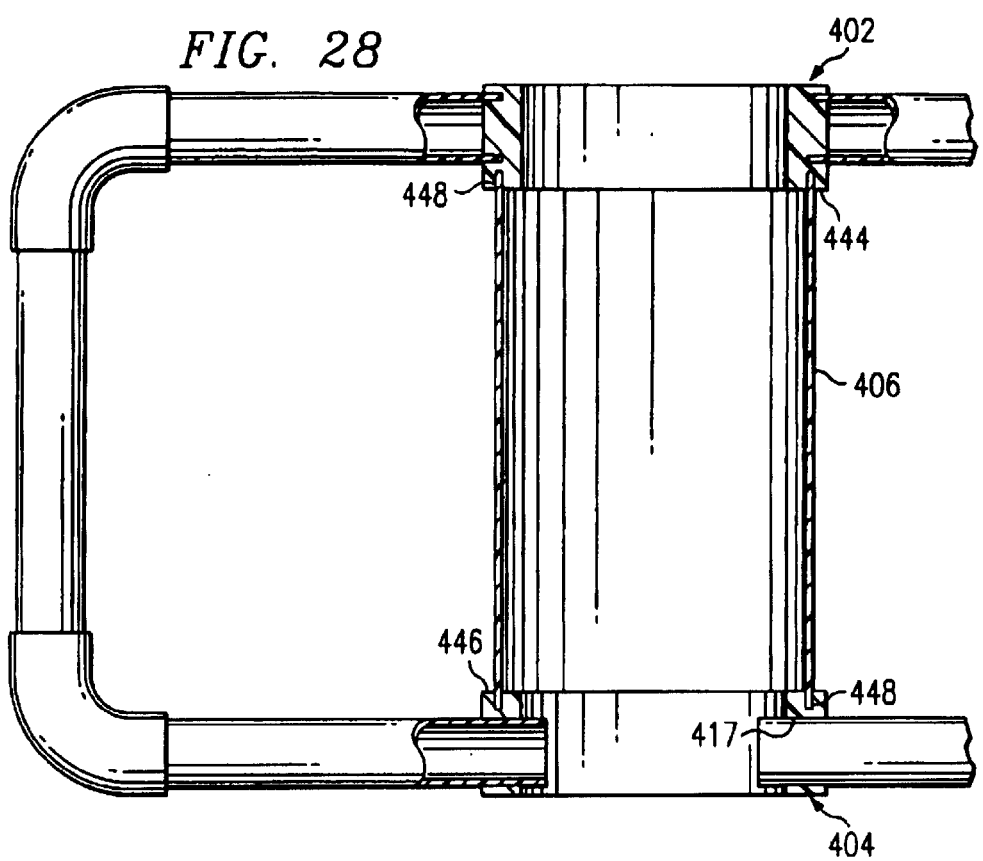
FIG. 28 is a partial cross-section of a first modification of the embodiment of FIG. 26.

The top member 402 and bottom member 404 are substantially similar and can be identical to reduce part requirements. Both the top member 402 and bottom member 404 are formed in a cylindrical shape defining an outer cylindrical surface 410. The surface 410 is concentric with the center axis 412 of the member. A plurality of pipe receiving apertures 414 are defined through the outer cylindrical surface 410 at an annular separation dependent upon the number of apertures 414 desired. Generally, the apertures 414 are formed by drilling an annular groove 416 into the outer cylindrical surface 410 centered on an axis which intersects the center axis 412 of the member. Alternatively, they can be molded into members 402 and 404. Formation of the annular groove 416 defines a cylindrical plug 418 which is concentric with the groove 416. Alternatively, apertures 414 can be formed as a simple circular hole 417 by drilling through the entire thickness of top or bottom member 402 and 404, as illustrated in FIG. 28. Holes 417 can alternatively be molded into member 402 and 404.

Each of the bracing member assemblies 408 is formed by a top horizontal pipe 420, a bottom horizontal pipe 422, a vertical pipe 424 and a pair of pipe elbows 426. As can be seen in the figures, the inner end of the top horizontal pipe 420 is received in a pipe receiving aperture 414 in the top member 402 while the inner end of the bottom horizontal pipe 422 is received in the pipe receiving aperture 414 of the bottom member 404 directly below. The elbows 426 secure the vertical pipe 424 between the outer ends of the top horizontal pipe 420 and bottom horizontal pipe 422. The pipes 420 and 422 are sized so that the inner end thereof will fit within the angular groove 416 and about the cylindrical plug 418. The pipes 420 and 422 can be secured to the top and bottom members 402 and 404 by adhesive, fasteners (such as screws, bolts or staples), an interference fit, or other suitable attachment mechanism. The elbows 426 can be secured to the ends of pipes 420, 422 and 424 by similar mechanisms. In fact, the pipe elbows 426 need not even be secured to the ends of all the pipes 420, 422 or 424. For example, pipe 424 can be unsecured in elbows 426 and be held in place if pipe 424 has a length that exceeds the separation of the facing ends of the elbows 426.

Preferably, the top surface 428 of the top member 402 and the top surfaces 430 of the top pipe elbows 426 between pipes 420 and 424 lie in a single plane 432. The grid 34, 250 or 280 can be laid on top of the surfaces 428 and 430 in the plane 432 and supported thereby by the salt platform 400. Similarly, the bottom surface 434 of bottom member 404 and the bottom surfaces 436 of the bottom pipe elbows 426 can be arranged in a single plane or multiple planes as necessary to be supported on the bottom of the salt tank.

Figure 27:
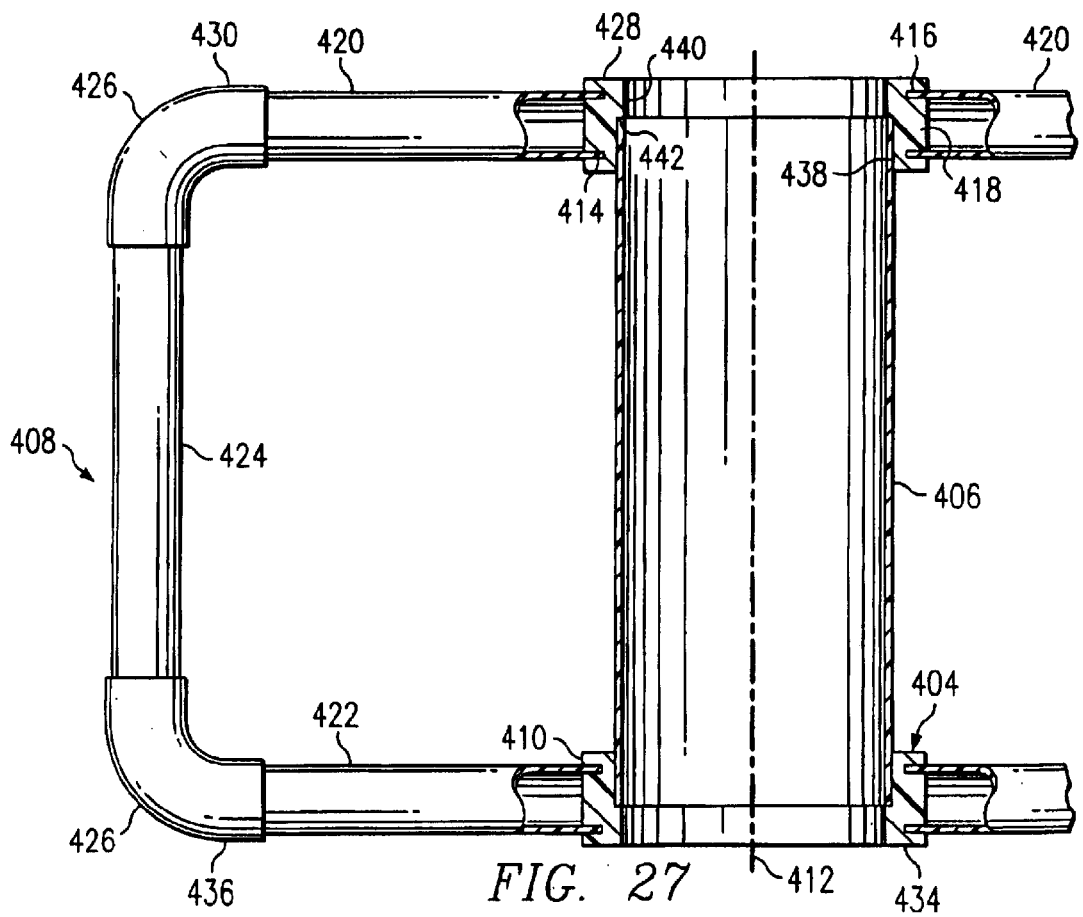
FIG. 27 is a partial cross-sectional view of the embodiment of FIG. 26.

While the salt platform 400 as described previously with only members 402 and 404 and assemblies 408 would be operable, it is preferred to also incorporate the spacing member 406 secured between the top member 402 and 404 to provide proper vertical spacing between the members 402 and 404. As seen in FIG. 27, the top and bottom members may have a ring shape which define a first cylindrical inner surface 438 and a second cylindrical inner surface 440 of slightly different diameters to define a horizontal ledge 442. The ends of the spacing member 406 can abut these ledges. Spacing member 406 can be secured to members 402 and 404 by adhesive, fasteners, or other securing mechanism.

Alternatively, as shown in FIG. 28, the bottom surface 444 of the top member 402 and the top surface 446 of the bottom member 404 can have a groove 448 formed therein to receive the ends of the spacing member 406. Again, the spacing member 406 can be secured to the top and bottom members 402 and 404 by adhesive, fasteners or other fastening mechanisms.

Figure 29:
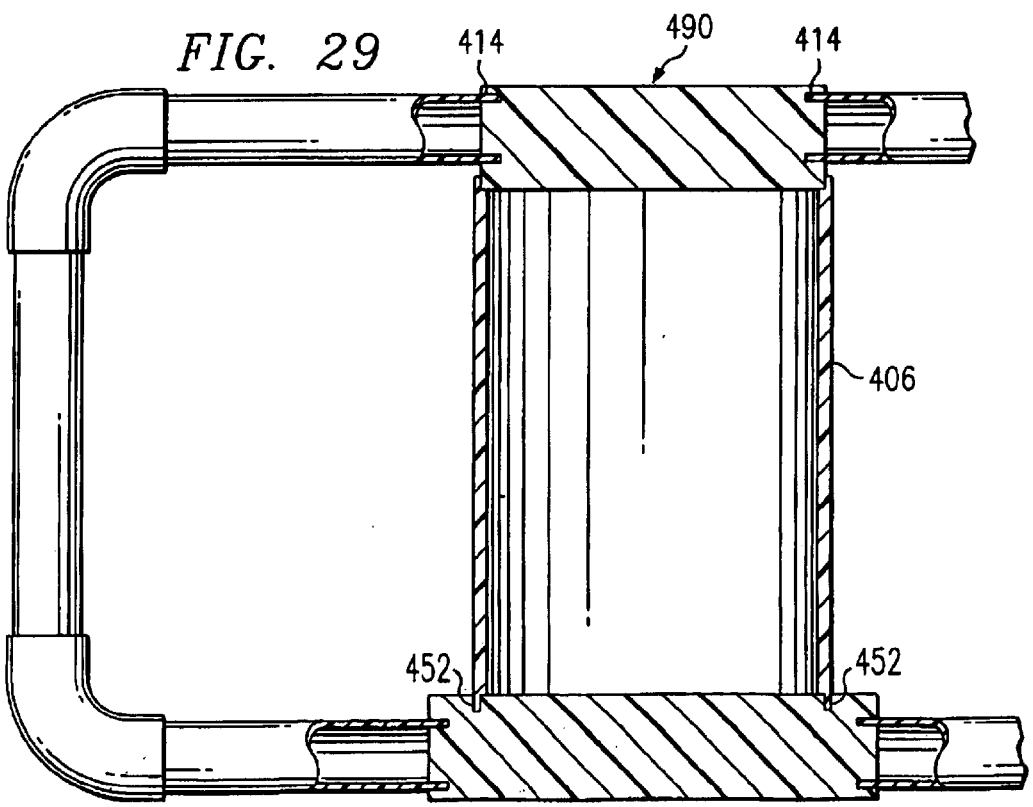
FIG. 29 is a side view of a modified top member.

The top member 402 and bottom member 404 can be formed of a solid cylindrical block 490 as seen in FIG. 29. The spacing member 406 can engage the solid cylindrical block 490 by forming a groove 452 in the abutting surface of the solid cylindrical block similar to groove 448 (as shown by the bottom member in FIG. 29), by contacting the surface, or by permitting a portion of the outer cylindrical surface of the solid cylindrical block to be received in the ends of the spacing member 406 if the spacing member 406 is formed in a tube configuration of sufficiently large inner diameter as seen in the top member in FIG. 29 by forming a shoulder 454 in the spacing member 406 which receives a portion of the block 490.

As can be understood, any number of bracing member assemblies 408 can be utilized, determined by the size and configuration and weight bearing capacity of the salt platform 400. Further, the length of the top and bottom horizontal pipes 420 and 422 will determine the diameter of the brine tank in which the salt platform 400 can be used. The length of the spacing member 406 and the vertical pipes 424 will determine the vertical distance between the top member 402 and bottom member 404 for a particular application. The material of salt platform 400 is preferably PVC. Regular scheduled 40 PVC pipe can be used, although schedule 80 and 120 pipe would also be suitable.

In salt platforms constructed in accordance with the teachings of the present invention, horizontal pipes 420 and 422 of diameter between ½" to 1" have been used. The angular groove 416 has been formed in the top member 402 such that the uppermost point of the angular groove 416 is about ⅛" below the top surface 428 of the top member 402, coplanar with the top surface 430 of the top elbows 426. Salt platforms 400 have been constructed which are designed to fit within 50" diameter brine tanks.

A top member 402 and bottom member 404 have been made out of 4½" OD schedule 120 PVC. Nine pipe receiving apertures 414 were formed in that PVC member at angular separations of 40 degrees about axis 412. A top member 402 and bottom member 404 have been formed of 4" PVC schedule 120 pipe. Ten pipe receiving apertures 414 were formed therein at an angular separation of 36 degrees. The first cylindrical inner surface diameter 438 was 3¼" while the second cylindrical inner surface diameter 440 was 3⅛", providing a 1/16" wide ledge 442 therebetween. Preferably, top and bottom members 402 and 404 6" or larger in diameter would be made of a solid cylindrical block. In one salt platform 400 constructed in accordance with the teachings of the present invention, the spacing member 406 was about 15" long, providing a separation of about 0.15" between the top member 402 and the bottom member 404.

Figure 30:
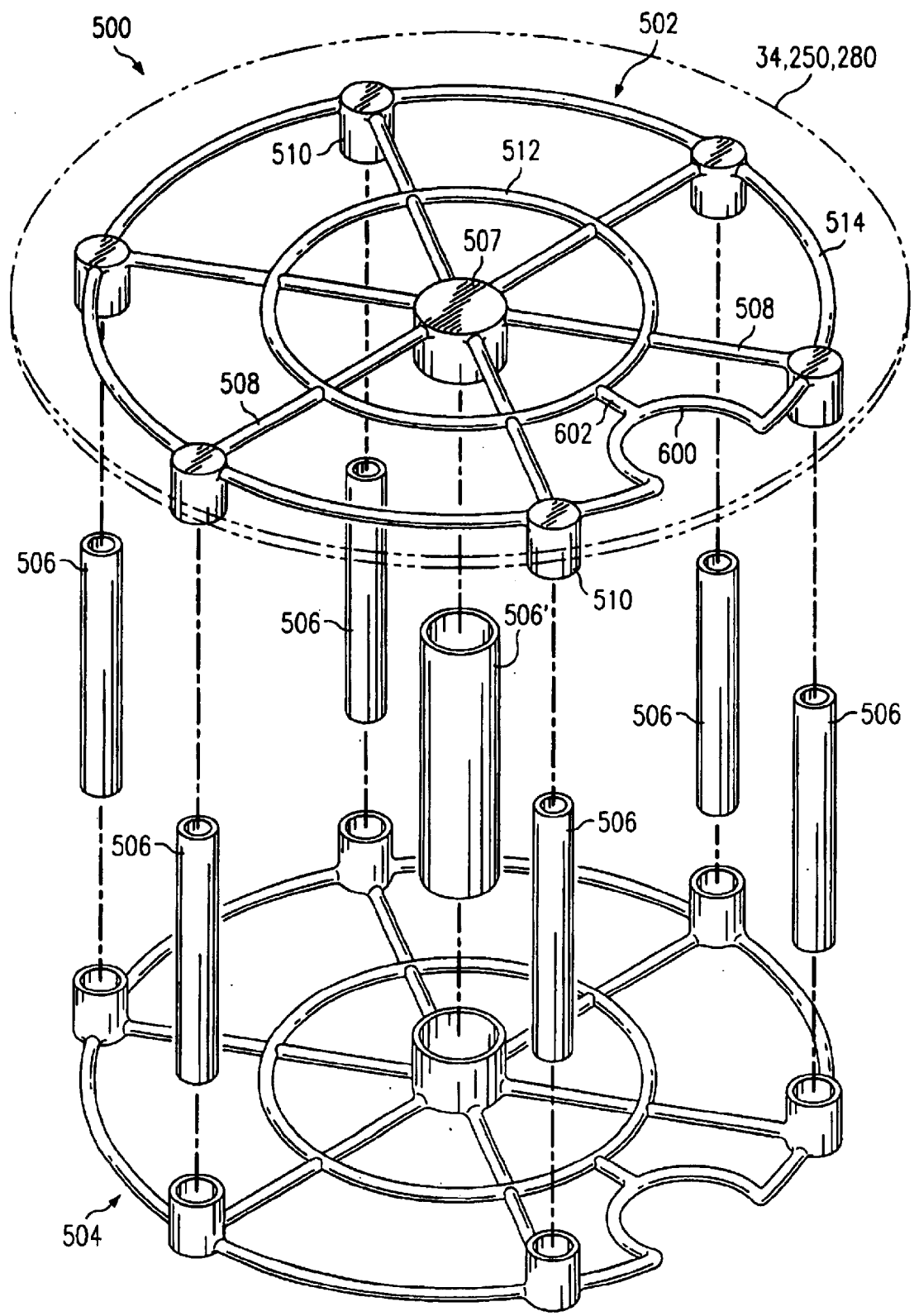
FIG. 30 is an exploded view of a seventh embodiment of the present invention.

With reference now to FIGS. 30–35, a seventh embodiment of the present invention will be described which is embodied by salt platform 500. As seen in FIG. 30, the salt platform 500 includes a top member 502, a bottom member 504 and a plurality of vertical spacing members 506. Any of the grids previously mentioned, including grids 34, 250 and 280, can be used on the salt platform 500, as desired. The top member 502 and bottom member 504 are preferably formed of identical shape, providing interchangeability and reduction of parts requirements. More specifically, the top and bottom members 502 and 504 are molded in an integral shape as will be described in greater detail.

Figure 33:
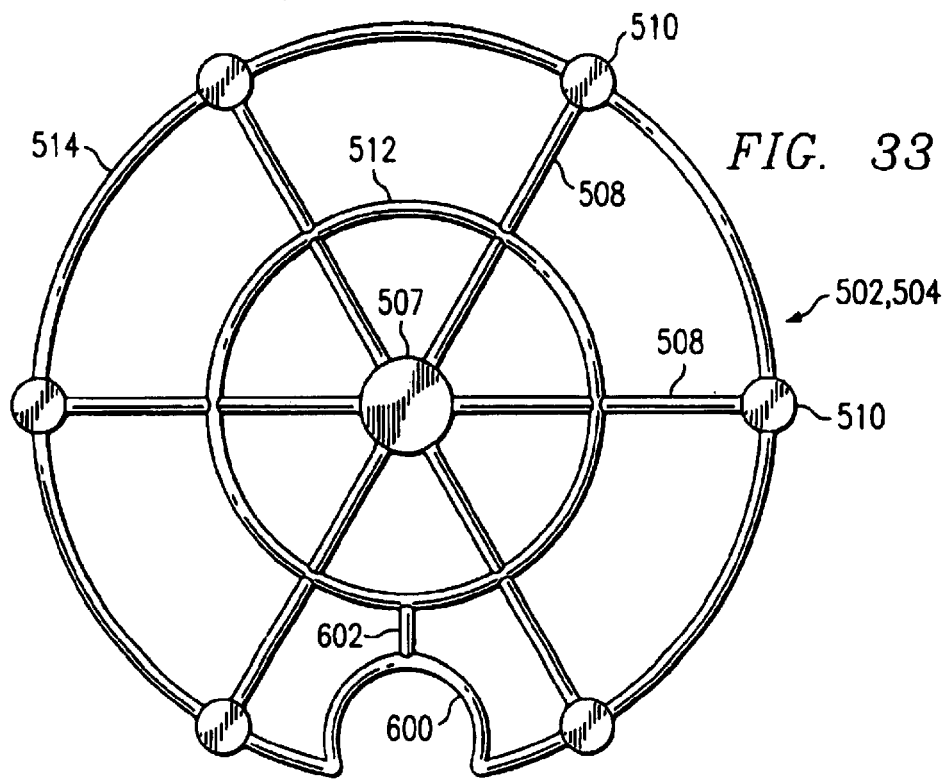
FIG. 33 is a top view of the embodiment of FIG. 30.

The details of the top member 502 will now be described. The bottom member 504 will be identical and is utilized as a mirror image of the top member, being installed so that identical sides of the top and bottom members are facing each other. The top member 502 includes a central hub 507 from which extend a series of radial arms 508. At their radially outward end, distant from the central hub 507, the arms 508 are secured to radial hubs 510. An inner circumferential element 512 joins the arms 508 between the central hub 507 and radial hubs 510 while an outer circumferential element 514 joins the radial hubs 510 and the radially outer ends of the arms 508 at the outer circumference of the top member 502. A well opening 600 can be formed in the outer circumferential 514 between two radial hubs 510 as seen in FIG. 33, with a short reinforcing section 602 connecting elements 512 and 514 for reinforcement.

Figure 31:
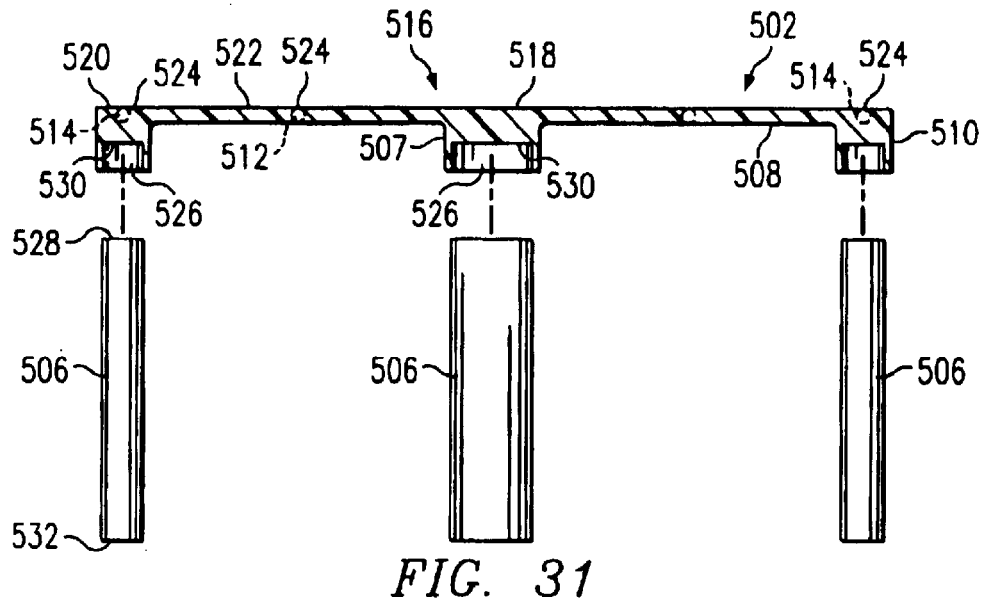
FIG. 31 is a side view and partial cross section of a portion of the embodiment of FIG. 30.

With reference to FIG. 31, the top member 502 is preferably molded to define a planer surface 516 on which the salt grid is placed. Surface 516 is formed by the upper surface 518 of central hub 507, upper surface 520 of the radial hubs 510, the upper surface 522 of the arms 508 and upper surface 524 of the elements 512 and 514. This provides maximum support for the salt grid across its width.

As can be seen in FIG. 31, each hub 507 and 510 has a downwardly facing cylindrical opening 526. The opening 526 is sized to receive the end of the vertical spacing members 506, which can be simple PVC pipe sections. The top 528 of each vertical spacing member 506 will abut against the lower surface 530 of the cylindrical opening 526.

As noted previously, the top member 502 and bottom member 504 are each preferably molded in a unitary fashion and are identical to each other. The bottom member 504 will simply receive the bottom end of the vertical spacing members 506 and the bottom end 532 of the vertical spacing members 506 will contact the surface 530 of the bottom member 504. The members 502 and 504 can be formed of many materials, such as polyethelene, etc.

As can be seen in FIG. 30, the members 502 and 504, and spacing members 506 form a salt platform with sufficient rigidity to support the salt grid and salt thereon. However, only two types of components are necessary to form the salt platform 500, namely a pair of members to form the top member and bottom member and a desired number of vertical spacing members 506. The center spacing member 506' can be the same diameter as the other spacing members 506, or larger, as shown in FIGS. 30 and 31. Of course, the central hub 507 would be larger than hubs 510 if spacing member 506' is larger than the other spacing members 506.

Figure 32:
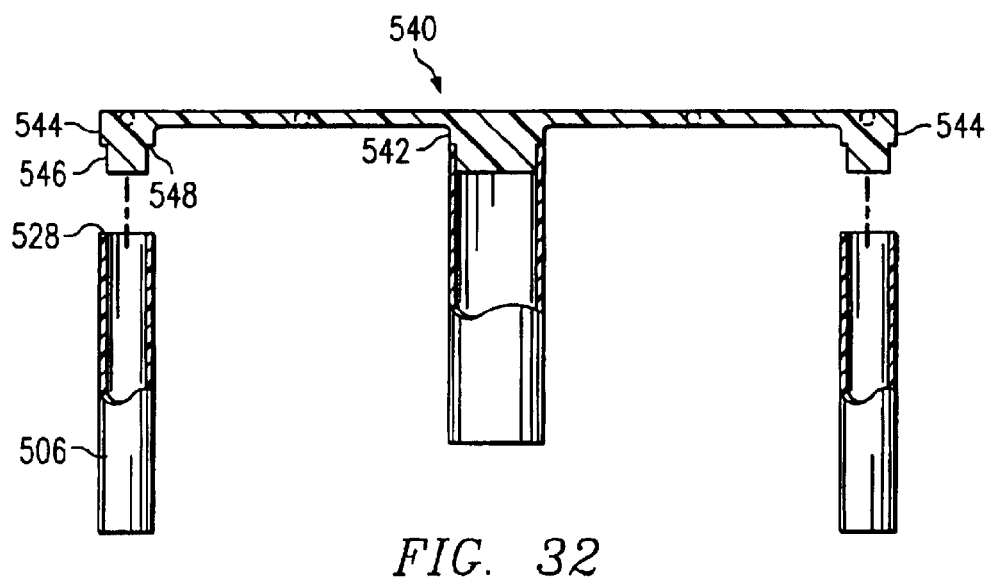
FIG. 32 is a side view in partial cross section of a portion of a modification of the embodiment of FIG. 30.

With reference now to FIG. 32, a top member 540 forming a first modification of the salt platform 500 is illustrated. The top member 540 is identical to the top member 502 with the exception that the central hub 542 and radial hubs 544 thereof have an outer stepped cylindrical configuration which defines a cylindrical side surface 546 and an annular end 548. The vertical spacing members 506, which are tubes, are sized to fit about the stepped cylindrical configuration as shown with the upper end 528 of the vertical spacing members 506 abutting the annular end 548 and being supported by the side surfaces 546. The bottom member used with top member 540 can have the identical configuration to top member 540. Again, both the top member 540 and its associated bottom member are each preferably integrally molded in a single piece. If desired, the inner circumferential element 512 can be deleted from members 502, 504 and 540.

Figure 35:
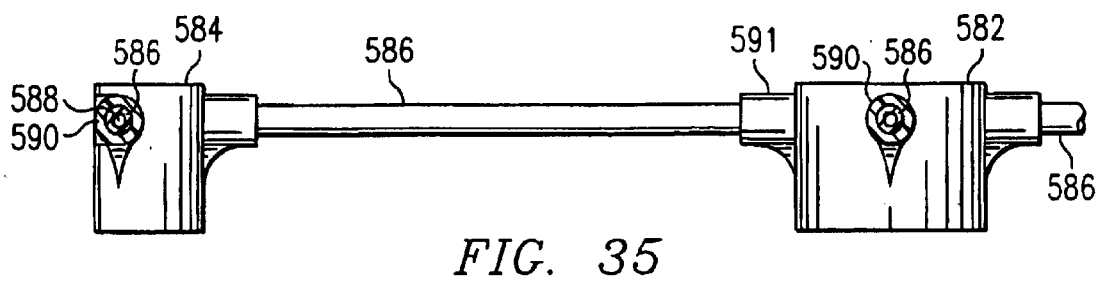
FIG. 35 is a side view in partial cross section of a modification of the embodiment of FIG. 30.
Figure 34:
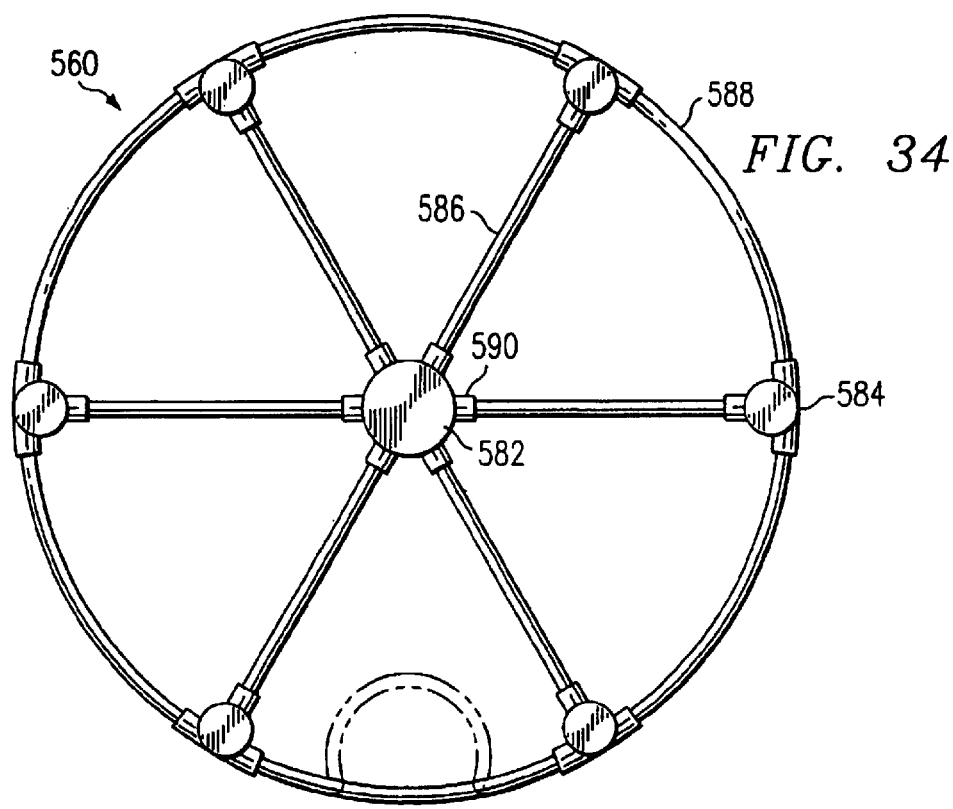
FIG. 34 is a top view of a modification of the embodiment of FIG. 30.

With reference to FIGS. 34 and 35, a top member 560 forming another modification of the top member 502 is illustrated. In top member 560, the member is not integrally molded. The top member 560 is formed of a series of individual components, either glued, press fit, or otherwise secured together, to form the top member. These components include a central hub 582, a plurality of radial hubs 584, radially spokes 586 and circumferential spokes 588. The central hub 582 and radial hubs 584 both define reinforced sockets 590 thereon to receive the ends of the spokes 586 and 588 to form the configuration of top member 560 as shown. The spokes, as noted, can be glued, press fit or otherwise fastened within the sockets 590 to form the complete top member. The spokes 586 and 588 can, for example, be formed of rods having a diameter between about 5/32nds inch and ¼ inch. If desired, an inner circumferential element can be added to member 560.

With reference now to FIGS. 36–41, a salt grid 600, forming an eighth embodiment of the present invention, will be described. The salt grid 600 is preferably a molded unitary piece, preferably molded of either polypropylene or polyethylene. The design illustrated is for a 24" salt tank. However, it is believed that designs of this type can be molded as a unitary piece to as large of 39" in diameter, or more. It is not believed that any salt grid 30 inches or more in diameter has ever been molded as a unitary piece. Alternatively, salt grid 600 could be molded in two or more pieces and then assembled to form the the salt grid. If molded in two or more pieces, molding dovetail connections into the pieces that mate with each other when the salt grid is assembled are preferred.

The salt grid 600 is formed with a circular platform 602 having a plurality of apertures 604 formed therethrough. Twelve radial reinforcing ribs 606 A–L are formed with platform 602 and extend radially outwardly from a center leg socket 608 to the outer periphery of the grid 600. Alternate ribs 606 (606 B, D, F, H, J, L) are molded near the outer periphery with leg sockets 610 A–F. The leg sockets 610 are adapted to receive vertical legs, such as PVC pipe, to support the salt grid 600 above the bottom of the salt tank.

Circumferential ribs 612 and 614 are formed in the grid 600 and are concentric with the leg socket 608 to provide additional support. Circumferential rib 614 is formed integrally with leg sockets 610 A–F also, to provide support for the leg sockets.

Formed in the platform 602 between leg sockets 610A and 610F is a 6" well opening knockout 616. As can be seen, the knockout 616 has a series of radially spaced circumferential apertures 618–626, allowing an installer to cutout the center portion of the knockout 616 within a selected circumference of apertures to form a well opening of a desired diameter. By cutting through the apertures 626, a 6" diameter well opening is provided.

Similarly, a 4" well knockout 628 is provided between radial ribs 606H and J, and where radial rib 614I ends. The 4" well knockout 628 has a series of circular apertures 630, 632 and 634, at different radius, to allow a center part of the 4" well knockout 628 to be cutout, up to 4", for a well opening.

Similarly, a 3" well knockout 636 is formed between ribs 606D and F, and where rib 606E ends. The knockout 636 also has circular holes 638, 640 and 642, permitting all or part of the knockout 636 to be cutout to form a well opening up to 3" in diameter.

Figure 39:
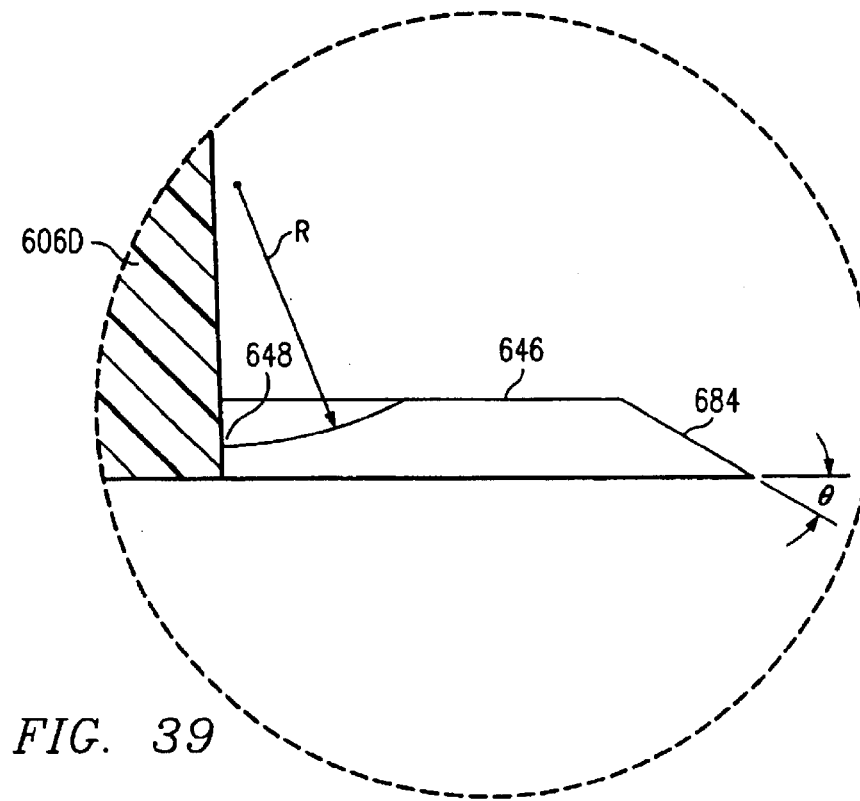
FIG. 39 is a detail view of a portion C of the salt grid of FIG. 38.
Figure 42:
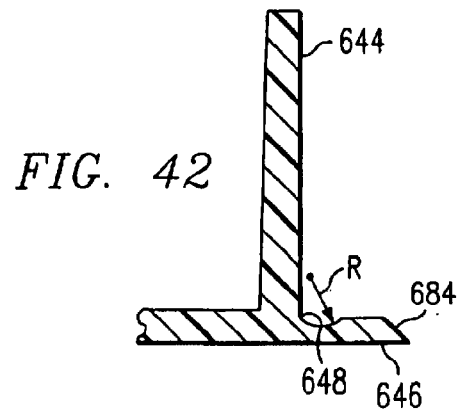
FIG. 42 is a cross-section of the periphery of the salt grid of FIG. 36 illustrating a mated lip and skirt.

The peripheral edge of the salt grid 600 ends in a series of mated downwardly directed skirts 644 and outwardly extending lips 646 as illustrated in FIGS. 39 and 42. Each skirt 644 is free to move relative the adjacent skirts 644 where they abut along edges 680. Similarly, each lip 646 mated to a skirt 644 is free to move relative the adjacent lips 646 where they abut along edges 682. If desired, salt grid 600 can be molded with a slight gap between facing edges 680 of adjacent skirts 644 and a slight gap between facing edges 682 of adjacent lips 646 to ensure no interference. Each lip 646 engages the interior wall of the salt tank to form a seal to prevent salt from falling past the edge of the salt grid. The inner end of each lip 646, where it joins with the skirt 644, forms a linear hinge line 648. This permits the lip 646 to pivot relative the skirt 644 to engage the inner wall of the salt tank without excessive fatigue failure. Forming hinge line 648 permits the necessary motion of the lip 646 to accommodate the variation in the wall dimensions and noncircular configuration of the typical salt tank, while reducing the possibility of fatigue failure as the salt grid is removed and reinstalled repeatedly in the salt tank. The use of downwardly directed skirts 644 mated with each lip 646 adds greater structural shape to the hinge line 648, enhancing the service life of the salt grid. The inner end of the lips 646 preferably has a cutout of radius R to reduce the thickness of the lips 646 at hinge line 648. Also, the outer edge 684 of lips 646 is preferably tapered to facilitate bending about hinge line 648 as the salt grid is inserted in the tank.

Figure 36:
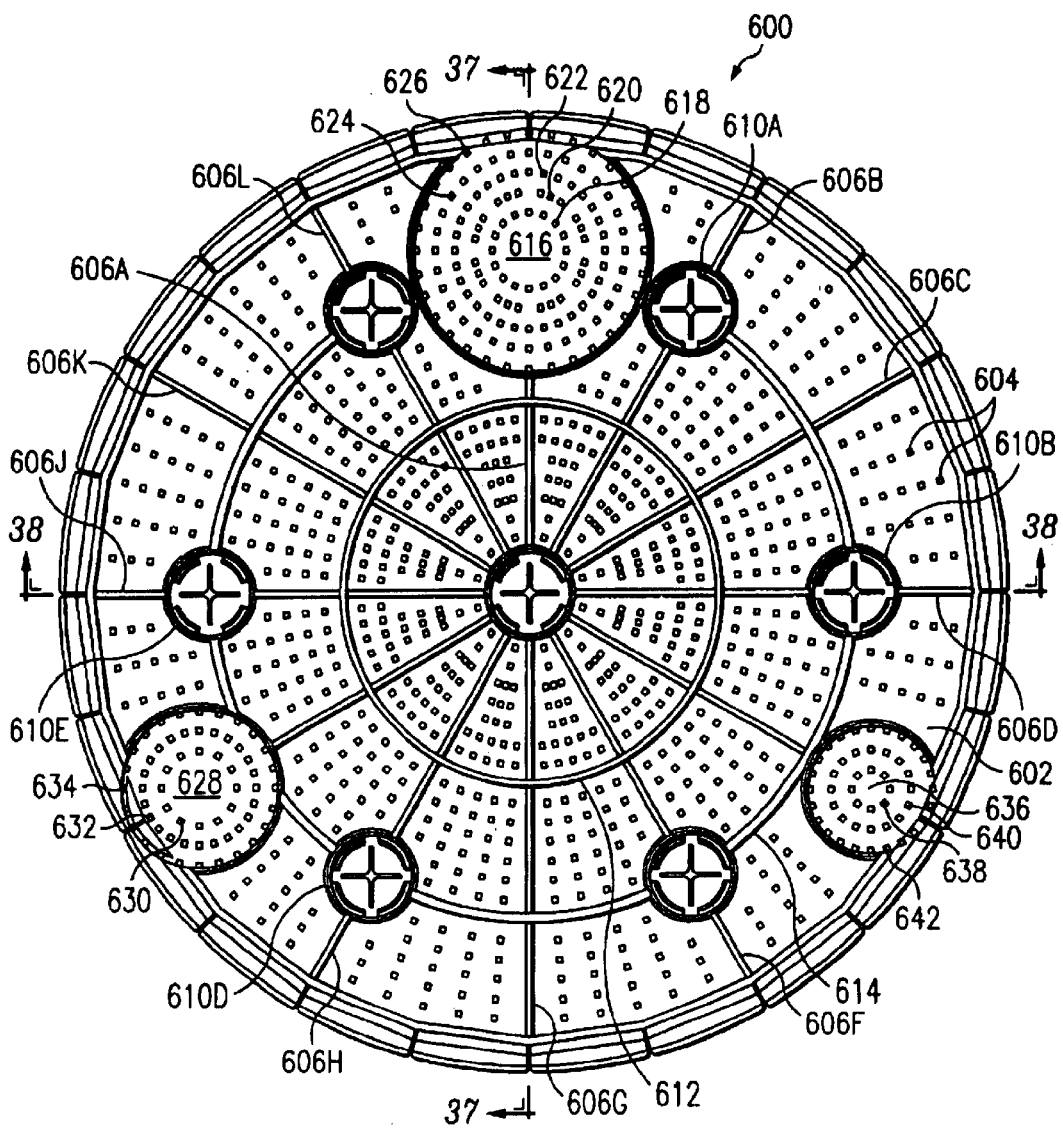
FIG. 36 is a plan view of a salt grid forming an eighth embodiment of the present invention.
Figure 37:
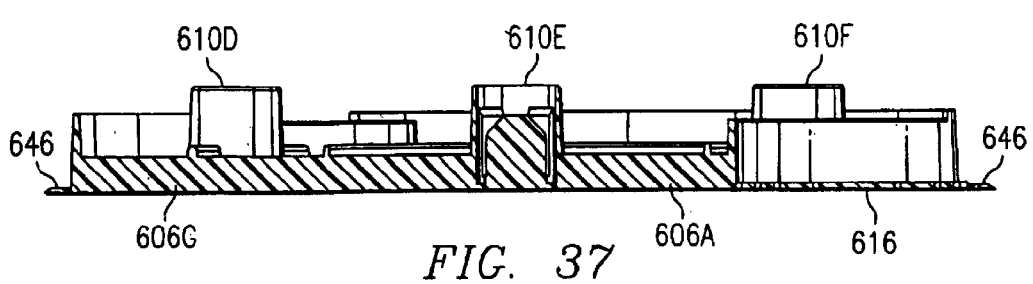
FIG. 37 is a cross-sectional view of the salt grid taken along line A—A in FIG. 36.
Figure 38:
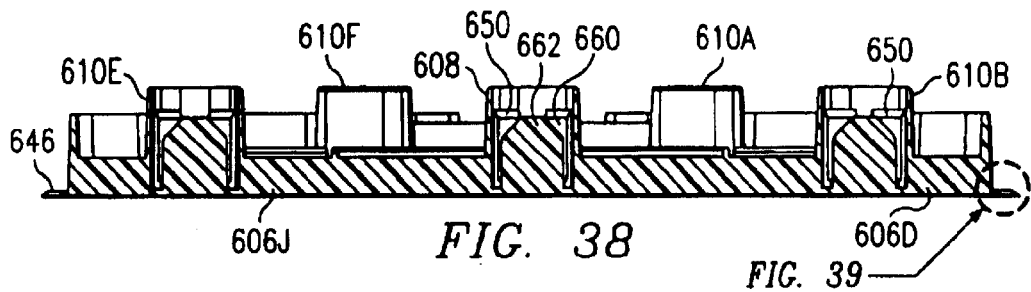
FIG. 38 is a cross-sectional view of the salt grid of FIG. 36 taken along line B—B.
Figure 40:
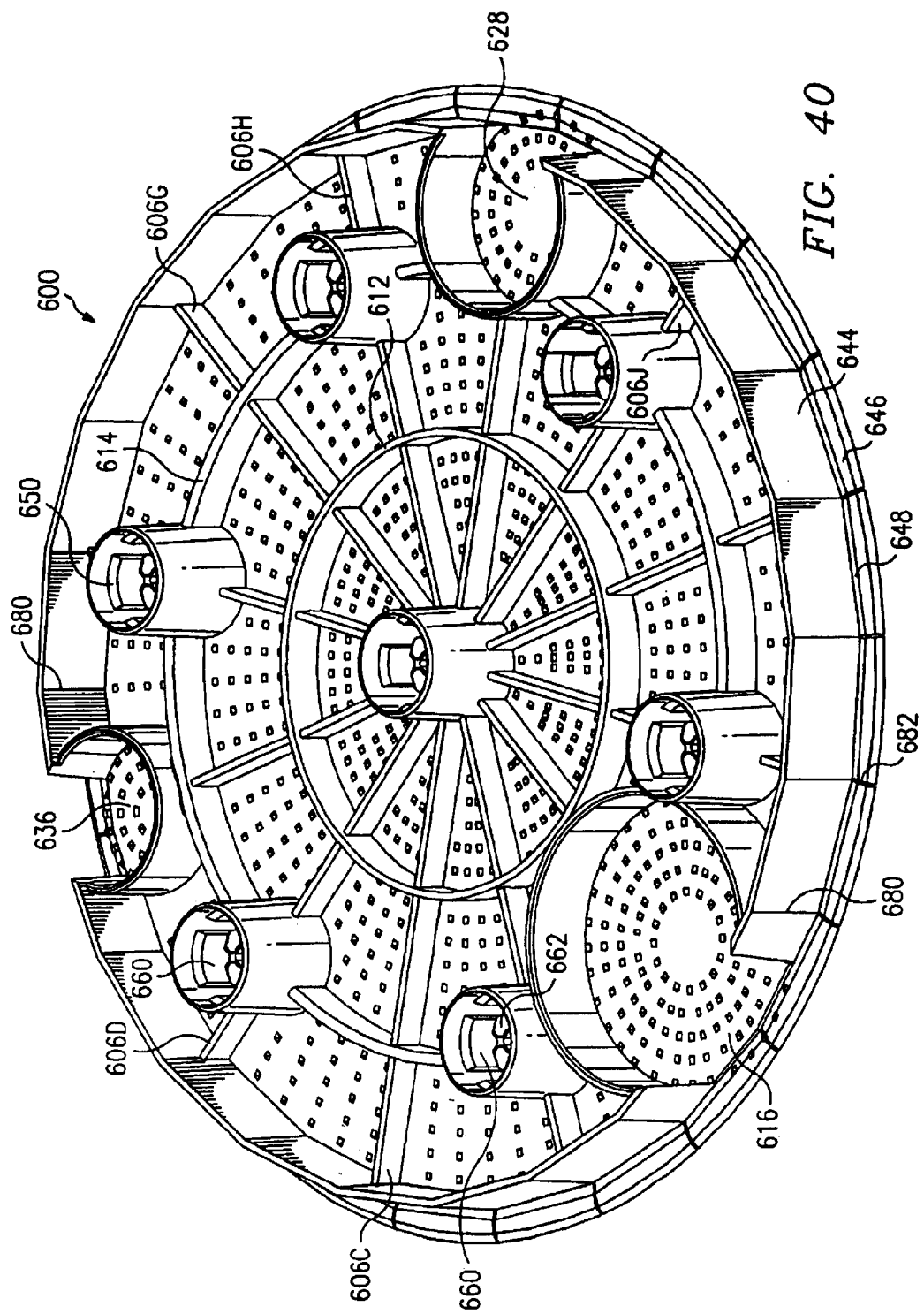
FIG. 40 is a perspective bottom view of the salt grid of FIG. 36.

With reference to FIGS. 36 and 40, the leg sockets 608 and 610 can be seen to include four ribs 660 formed in the interior thereof to help center the PVC pipes or other legs within the socket 608 and 610. Preferably, the rims 650 of the ribs 660 are tapered to permit easier insertion of a vertical leg therein. Also, a cruciform 662 is formed at the bottom of each of the sockets 608 and 610 which extends up from the bottom a significant portion of the depth of the sockets and which has dimensions slightly less than the interior diameter of the PVC pipe leg to be used. The PVC pipe is thus centered correctly between the ribs 660 and inserted over cruciform 662 within each leg socket to form a secure fit.

A significant advantage of the present salt grid 600 is the ability to mold the salt grid 600 in a single piece. This reduces cost and increases efficiency. By using knockouts 616, 628 and 636, the user has significant flexibility in selecting the position and size of the aperture through the salt grid needed in a particular salt tank.

In one grid constructed in accordance with the teachings of the present invention, the grid was adapted for use in a salt tank of 24" interior diameter. Each lip 646 is tapered at its outer edge 684 an angle $\theta$ of 30° and has a radius R of about 0.5 inches where it emerges into the inner edge 648 forming the hinge.

In a 30" diameter design, it is preferable to have two 6" well knockouts, as positioned between ribs 606B and L and 606D and F. No 4" or 3" knockouts would be necessary.

The leg sockets 608 and 610 would be about 4" deep.

With reference now to FIGS. 43–52, a salt platform 700 forming a ninth embodiment of the present invention will be described. The salt platform 700 can be seen to be assembled of discrete components including hubs 702, horizontal radial braces 704, outside horizontal curved braces 706 having horizontal pipe holders 708, horizontal pipe sections 710, vertical pipe sections 712 and pipe elbows 714.

The hubs 702 can be seen to include a series of locking slots 716 formed in the outer diameter of the hub which have a generally key-hole cross section and a locking bar 718 extending across each slot. The top 720 of each hub 702 is solid to support a salt grid. The bottom 722 is open to receive a vertical support pipe section, such as a PVC pipe section.

Figure 45:
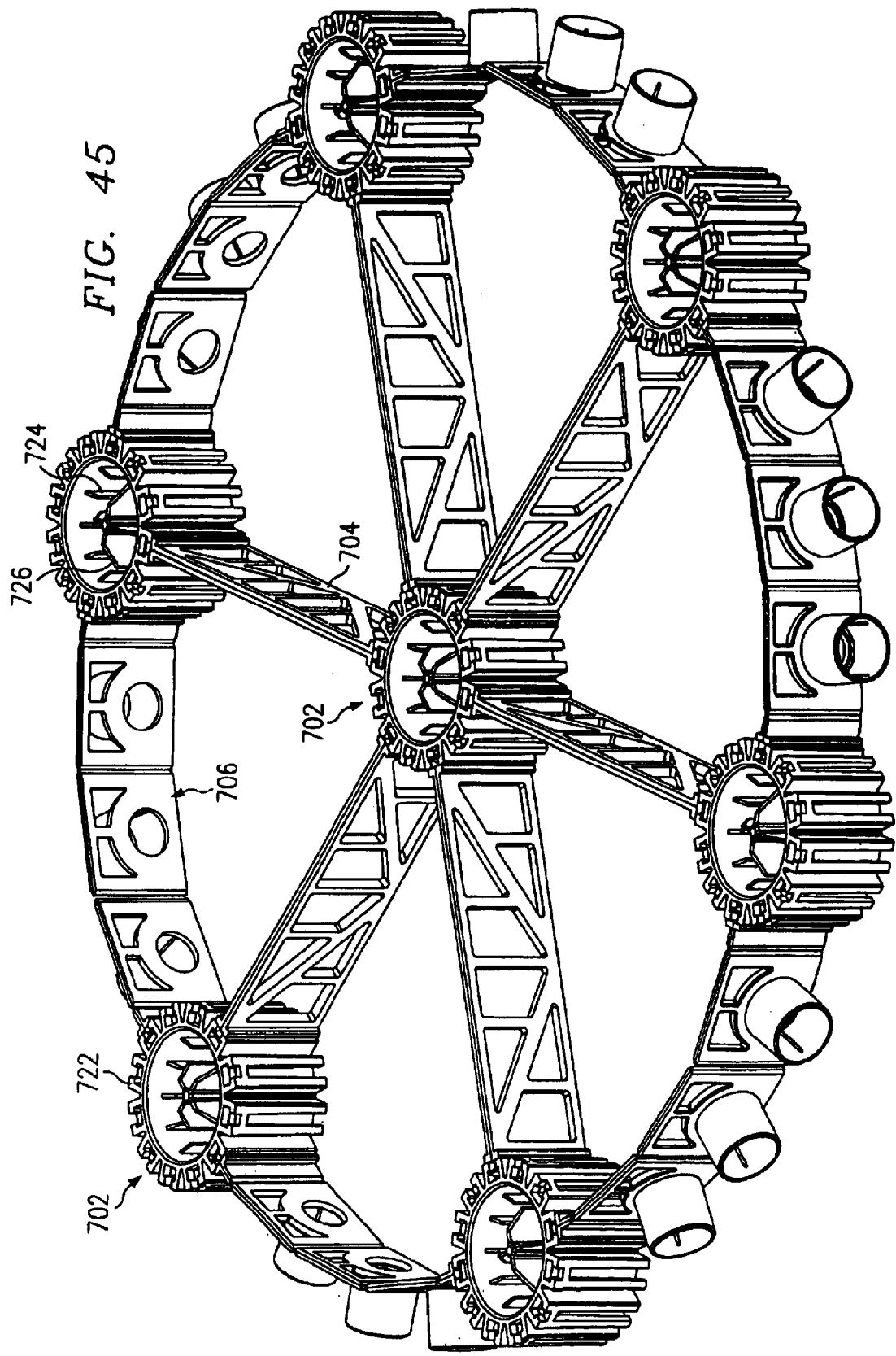
FIG. 45 is lower perspective view of the hubs, horizontal radial braces and outside curved braces.
Figure 46:
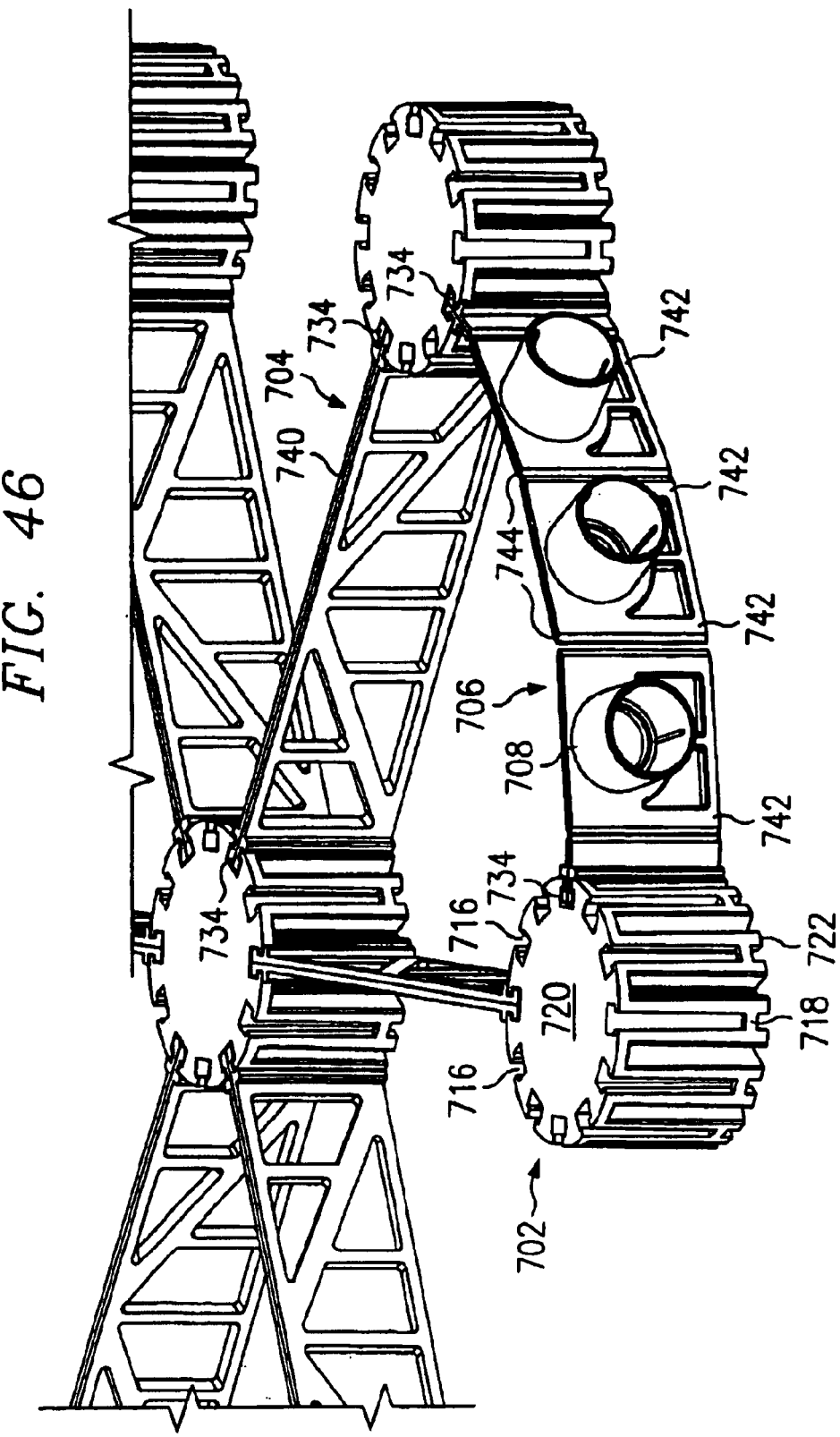
FIG. 46 is an upper perspective view of a section of the salt platform.

As seen in FIG. 45, the hubs form interior members 724 to form a tight fit with a vertical support pipe section and a cruciform 726 to form a snug fit against the inside surface of a vertical support pipe section. Vertical support pipe sections such as shown in dotted line 728 will space hubs 702 in the upper portion 730 of the salt platform a desired distance above the lower portion 732.

In one design constructed in accordance with the teachings of the present invention, the hubs are about 3.15 inches in diameter and have slots set every 30 degrees about the circumference of the hub(forming a total of twelve slots). The hubs are designed to accommodate vertical support pipe sections of schedule 40 PVC pipe meeting ASTM-D-1785 and ASTM-D-2665 standards(approved for potable water). The sections 728 used are 1.5 inch pipe having a minimum wall thickness of 0.145 inch plus or minus 0.020 inch, with an outside pipe diameter of 1.90 inches plus or minus 0.006 inches. However, hubs 702 can be constructed of any size desired, such as six, eight, or ten inches in diameter.

Figure 49:
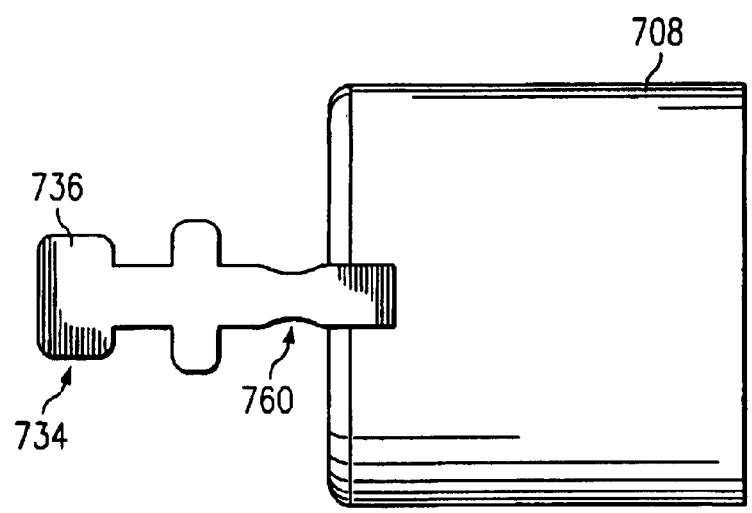
FIG. 49 is a top view of the stub spoke.
Figure 50:
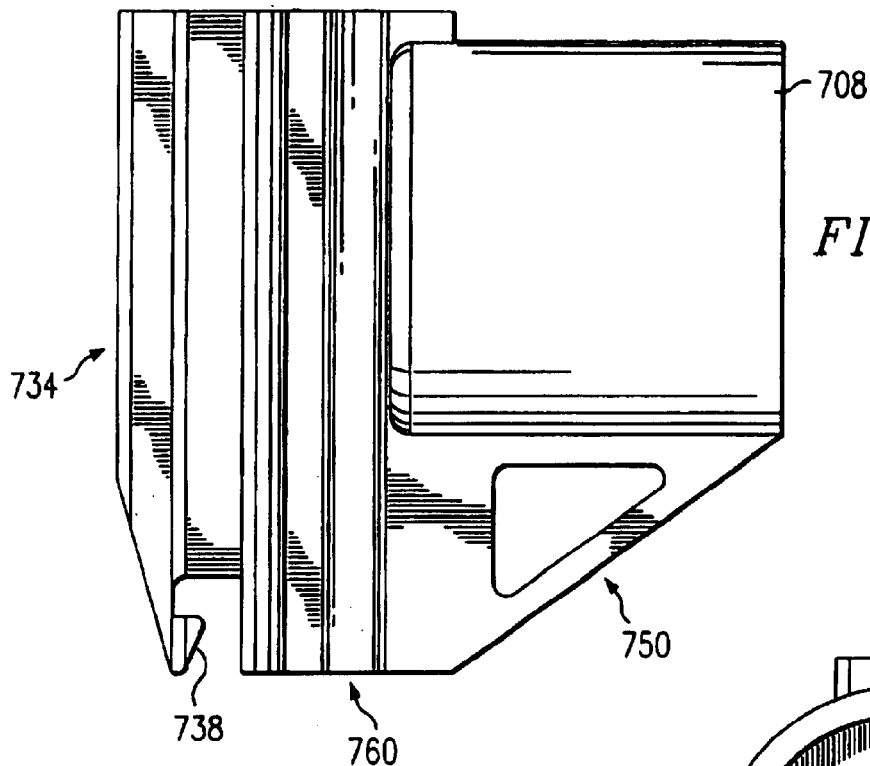
FIG. 50 is a side view of the stub spoke.
Figure 51:
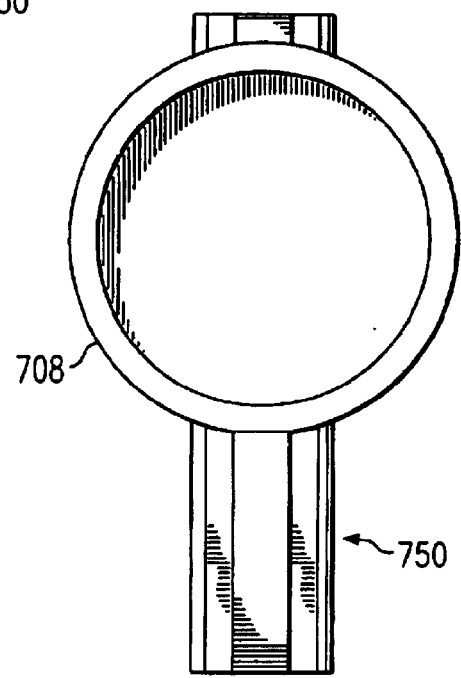
FIG. 51 is a front view of the stub spoke.
Figure 52:
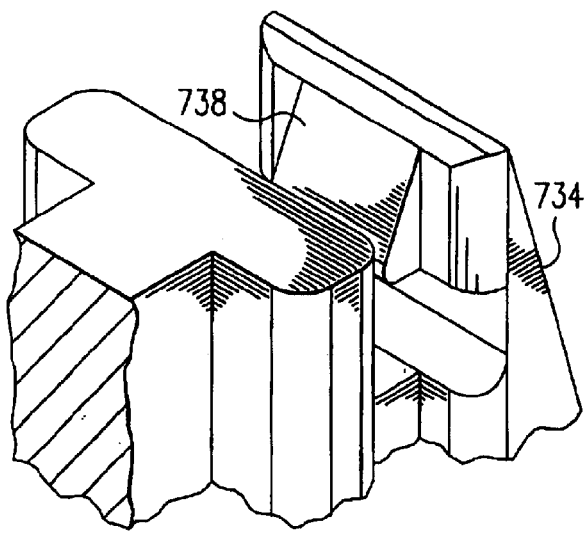
FIG. 52 is a detail view of the latch in the stub spoke.

The horizontal radial braces 704 can be seen to form locking members 734 at the ends of the braces 704, such as seen in FIGS. 49,50 and 52. The locking members are received within the locking slots 716 to secure the braces 704 to the hubs 702. Each locking member 734 can be seen to include a T-shape portion 736 to slide into the key slot cross section of the locking slots and a flexible catch 738 which is deflected over the locking bar 718 as the locking member is inserted in the locking slot and snaps back over the locking bar 718 when fully inserted into the locking slot to lock the locking member 734 in the locking slot 716. The radial braces 704 have a girder like configuration to provide strength with light weight and a minimum of material. The top edge 740 of the radial braces 704 will lie in the same plane as the top surface 720 of the hubs to provide maximum support for the salt grid.

Figure 47:
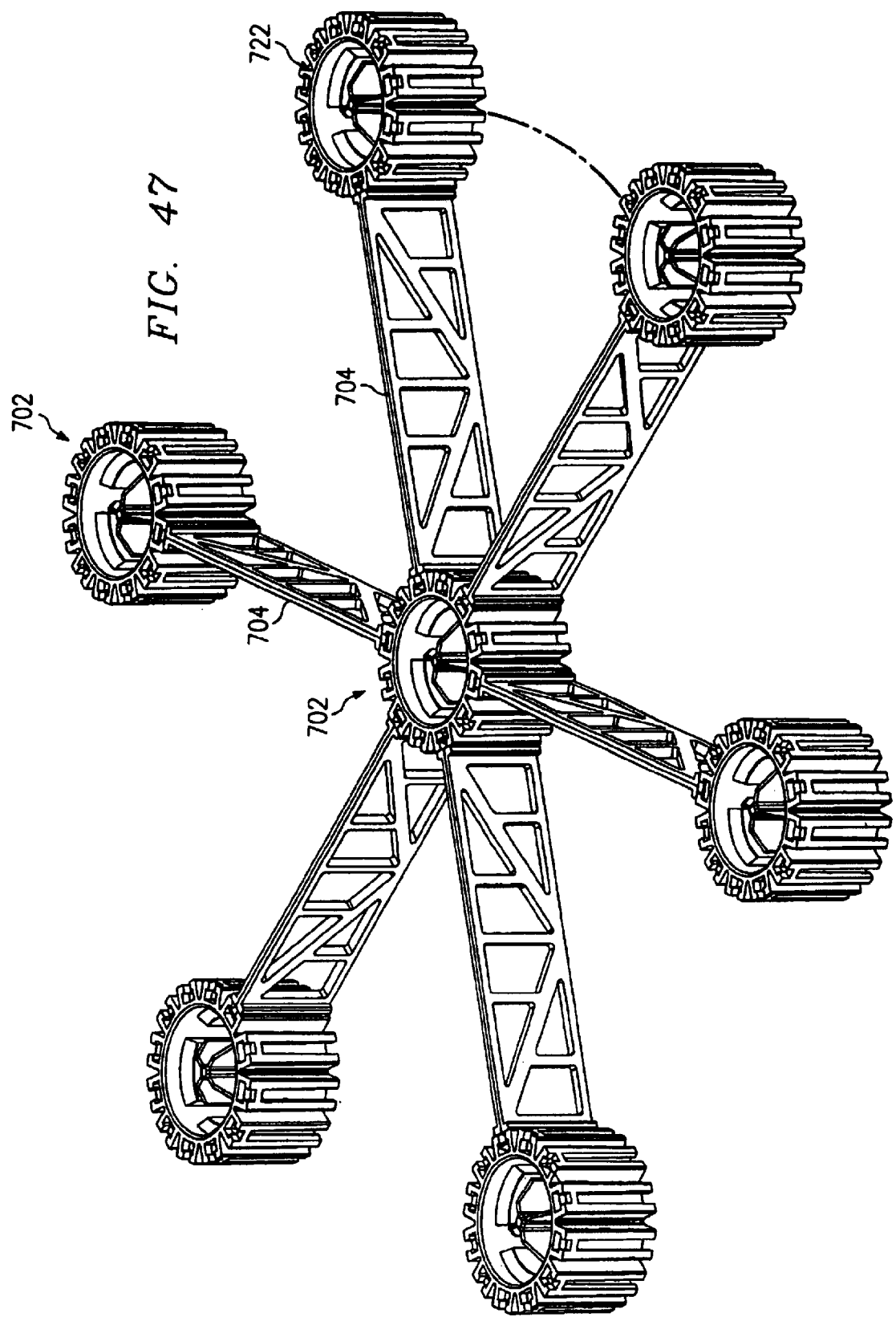
FIG. 47 is a perspective view of hubs and horizontal radial braces.
Figure 48:
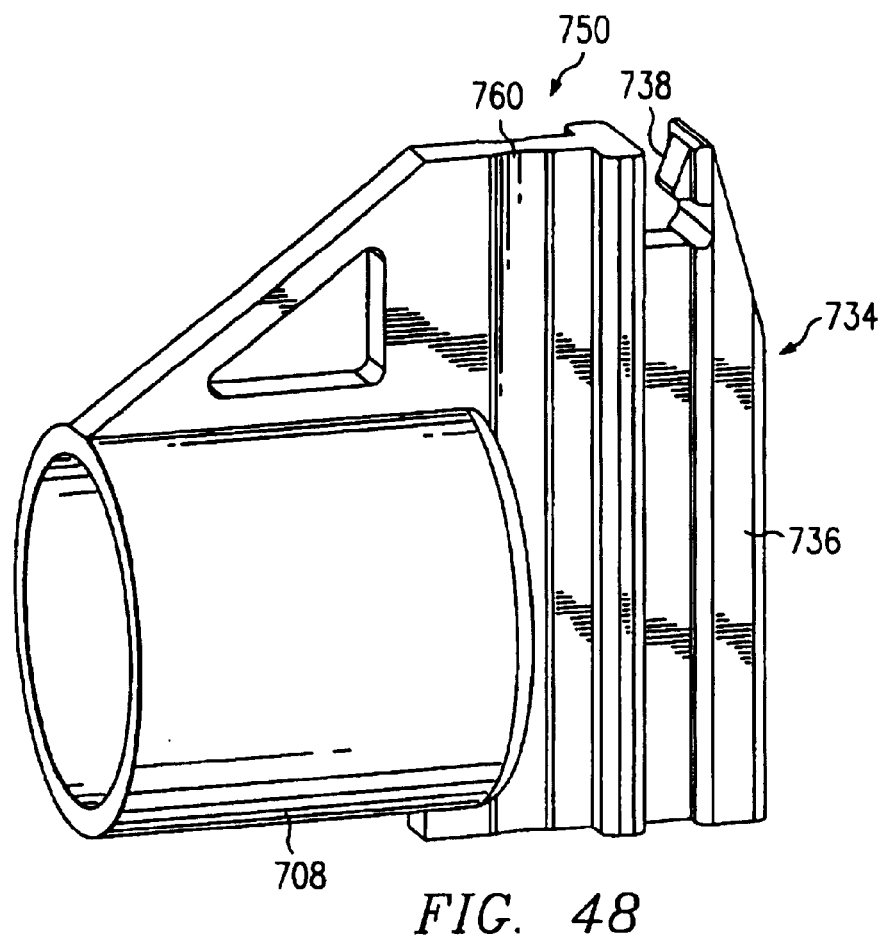
FIG. 48 is a perspective view of a stub spoke used in the embodiment of FIG. 43.

By using hubs 702 and radial braces 704 as shown in FIG. 47, a complete salt platform can be formed. However, it is preferable to also use outside horizontal curved braces 706 as well. The curved braces 706 are formed of a series of bosses 742 forming the pipe holders 708 separated by thinned sections 744 which allow the curved braces 706 to be curved to a desired radius. The bosses at the ends of the curved braces 704 have locking members 734 to be fit into adjacent hubs 702 as seen in FIGS. 43 and 45

Again, an effective salt platform is formed by using only hubs 702, radial braces 704 and curved braces 706. The bosses 742 do not need to be formed with pipe holders 708 in such a construction. The curved braces 706 help keep the hubs 702 from twisting out of the desired position and add additional support for the outer edge of the salt grid.

Figure 43:
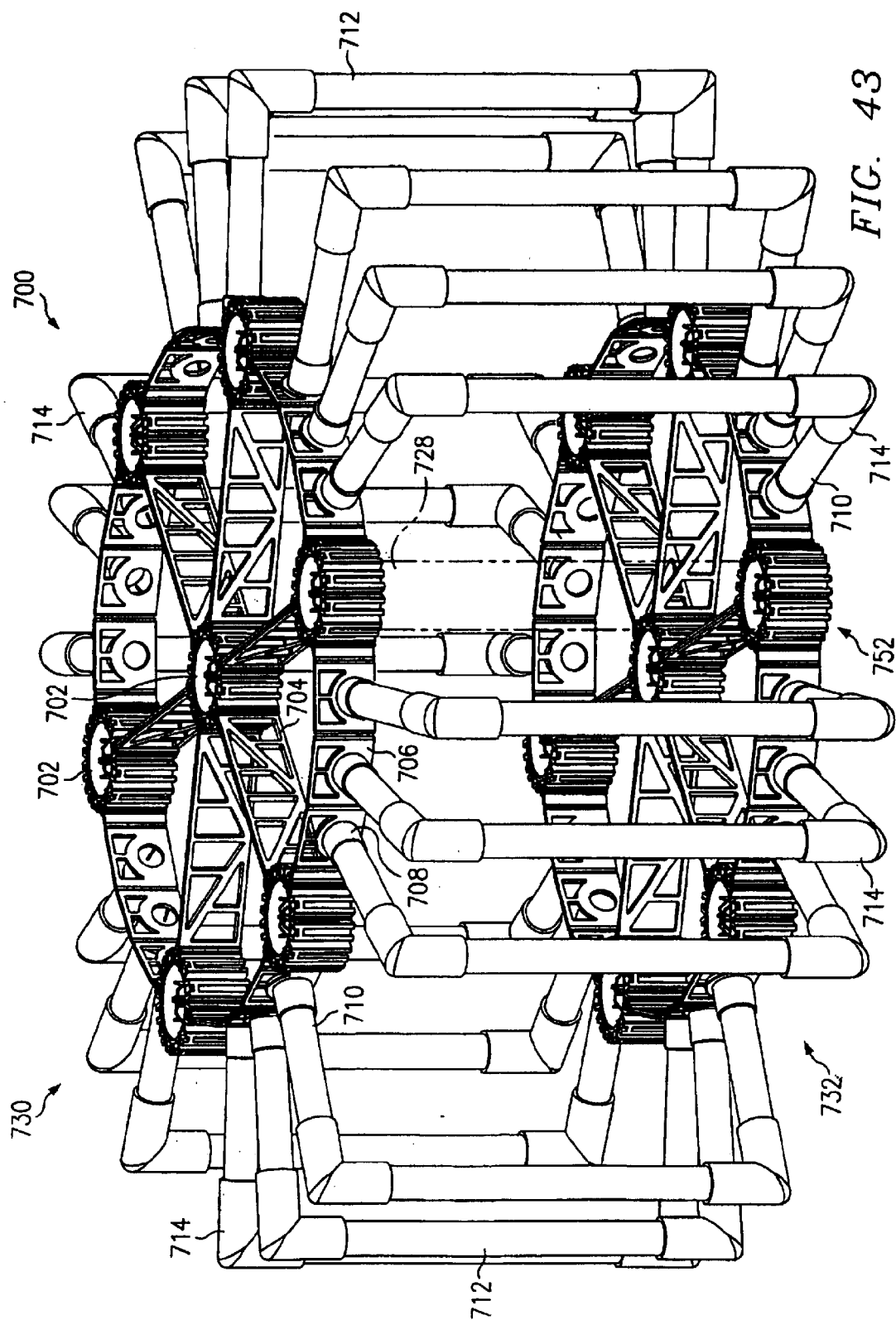
FIG. 43 is a perspective view of a salt platform forming a ninth embodiment of the present invention.
Figure 44:
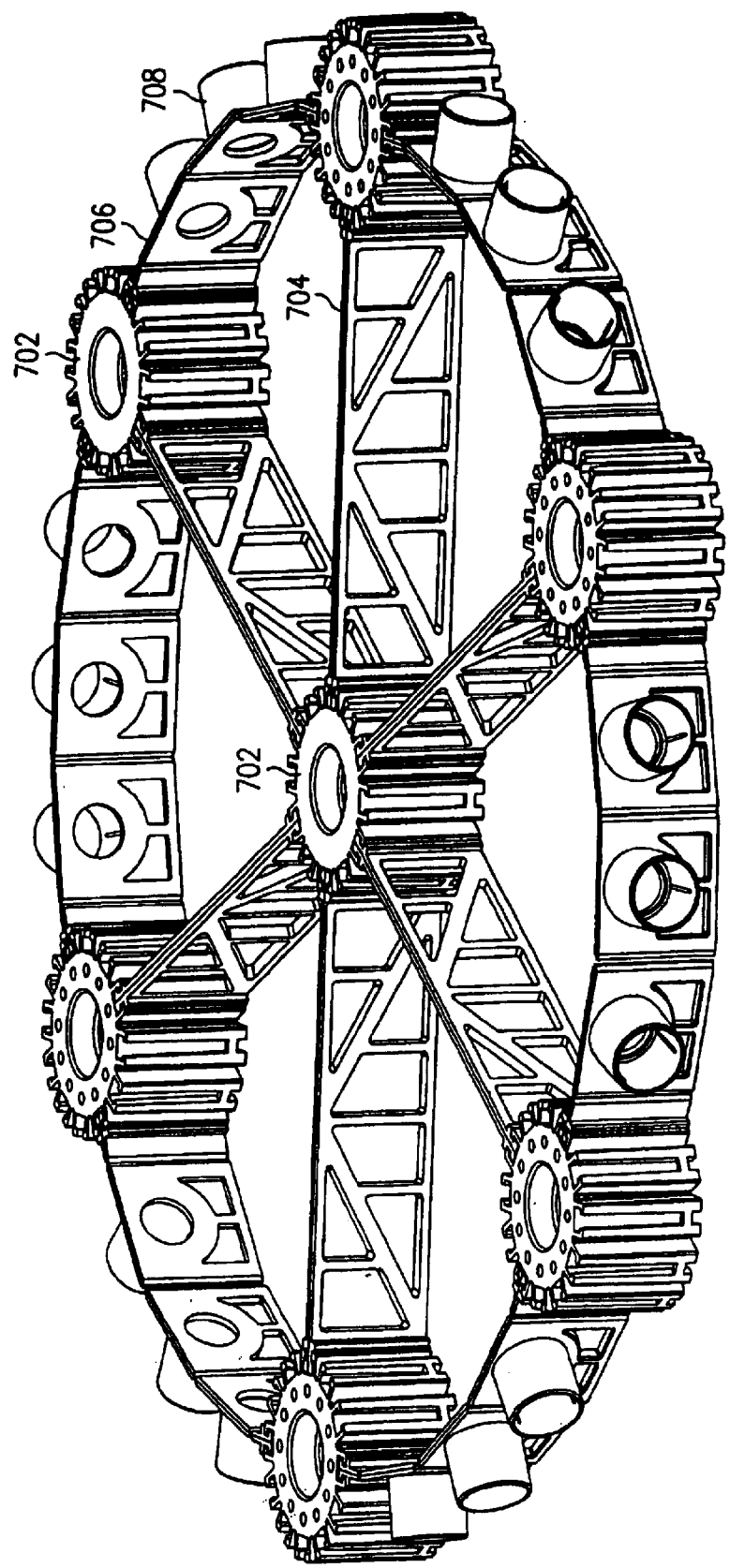
FIG. 44 is an upper perspective view of hubs, horizontal radial braces and outside curved braces of the salt platform of FIG. 43.

However, if bosses 742 are formed with pipe holders 708, the size of the salt platform can be easily enlarged by securing conventional pipe sections 710, 712 and elbows 714 together as shown in FIG. 43, secured to the pipe holders 708. The pipe sections 710, and 712 and elbows 714 can be fastened to each other and to pipe holders 708 by cement, glue, fasteners such as bolts and screws, and/or friction fit.

Preferably, the part of the bosses at the end of the inner end of the pipe holders 708 are open to expose the ends of the pipe sections 710 received therein. This has a number of advantages. In this manner, the pipe sections 710 and 712 and elbows 714 can fill with water to prevent buoyancy of the salt platform which would otherwise occur if the interior of the pipe sections and elbows were sealed. When the salt platform is removed from a brine tank, all of the water runs out through the openings in the bosses at the lower portion 732. Also, the displacement of water that occurs when the salt platform in placed into the brine tank is reduced, avoiding a possible error in measuring the exact amount of water over the grid, and thus avoiding a possible error in the dosage of salt.

With reference to FIGS. 48–52, a stub spoke 750, which can be used in the salt platform 700, is illustrated. The stub spoke has a locking member 734 to be received in a locking slot 716 in any of the hubs 702. It also defines a pipe holder 708 for receiving a pipe section 710 therein. Stub spokes 750 can be attached to radially outer hubs 702 to allow pipe sections 710 and 712 and elbows 714 to fill the gaps 752 between pipe sections 710 and 712 and elbows 714 supported from adjacent curved braces 706. Alternatively, stub spokes 750 can be used to form a salt platform of any size and configuration. For example, a hub 702 can be connected to a pipe section 710 through a stub spoke 750, while the other end of the pipe section 710 is connected to another hub 702 by a second stub spoke 750. As a result, any desired configuration of salt platform is possible. The stub spoke 750 preferably has a thinned section 760 to allow the pipe holder 708 to pivot slightly relative the locking member 734, say perhaps 10 to 15 degrees, to accommodate a pipe section 710 at a skewed angle.

The hubs 702, radial braces 704, curved braces 706 and stub spokes 750 are preferably injection molded. They can be molded of polypropylene, or a mixture with copolymer for strength.

As can be appreciated, the hubs 702, radial braces 704, curved braces 706 and stub spokes 750 can be easily locked or snapped together; making assembly very simple.

If a curved brace 706 is left out between adjacent hubs 702, a well can be placed there between when using a well inside the brine tank.

It would be expected for brine tanks of 24 inch diameter and less, pipe holders 708 would not be used. For brine tanks of 30 inches to 72 inches, or greater, it would be expected that pipe holders 708 would be used with pipe sections 710 and 712 and pipe elbows 714 of the proper size.

The hubs 702 are designed to withstand the compressive loading of the vertical mass placed upon the salt grid. The locking slots 716 are designed to withstand the tensile pull placed upon the radial braces 704 created by the vertical mass on the salt grid as it bears down on the salt platform.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

What is claimed is:

1. A salt platform, comprising:
   a plurality of hubs, each hub having at least one locking element;
   at least one radial brace, the radial brace having first and second ends, each end having a locking element to engage a locking element in a hub to secure the radial brace and hub together wherein the locking element in the hub includes a T-shaped slot and the locking element in the radial brace includes a T-shaped portion received in the T-shaped slot.

2. The salt platform of claim 1 wherein the hubs each are provided with a plurality of locking elements formed by locking slots about an outer circumference thereof.

3. The salt platform of claim 1 further comprising a plurality of curved braces
having locking elements to secure a curved brace to a hub.

4. The salt platform of claim 1 wherein the hubs each define a cylindrical socket for receiving vertical support members.

5. The salt platform of claim 1 wherein each of said curved braces has at least
one pipe holder for receiving a pipe section.

6. The salt platform of claim 1 wherein the locking element in the hub includes a plurality of T-shaped slots distributed about an outer circumference of the hub.

7. The salt platform of claim 6 wherein the plurality of T-shaped slots are distributed about the circumference at 30 degree angles to adjacent T-shaped slots.

8. The salt platform of claim 1 wherein the hub further includes a locking bar at an end of said T-shaped slot.

9. The salt platform of claim 1 further including at least one stub spoke, said stub spoke having a locking member and a pipe holder.

10. The salt platform of claim 9 wherein the stub spoke further has a thinned section connecting the locking member and the pipe holder to permit pivotal motion therebetween.

11. A method of assembling a salt platform comprising the steps of:
inserting the locking element of a first member into a locking element of a hub to support a salt grid to lock the first member and hub together wherein the step of inserting the locking member of a first member includes the step of inserting a locking member of a curved brace.

12. The method of claim 11 wherein the step of inserting the locking member of a first member includes the step of inserting a locking member of a radial brace.

13. The method of claim 11 wherein the step of inserting the locking member of a first member includes the step of inserting a locking member of a stub spoke.

14. The method of claim 11 further comprising the step of inserting a pipe section in a pipe holder formed on the first member.

15. A salt platform comprising:
at least one hub, said hub having at least one locking element; and
at least one connector, the connector having at least one end with a locking element, the locking elements of the connector and the hub engaged to secure the hub to the connector, the locking element of the hub having a locking slot with a key hole cross-section and a locking bar, the locking element of the connector having a T-shape portion and a flexible catch, the T-shape portion sliding into the locking slot of the hub until the flexible catch deflects over the locking bar to lock the connector to the hub.

16. The salt platform of claim 15 wherein the connector is a radial brace.

17. The salt platform of claim 15 wherein the connector is a stub spoke, the stub spoke having a pipe holder for receiving a pipe section and a thinned section to allow the pipe section to pivot relative the locking element.

18. The salt platform of claim 15 wherein the locking slot has first and second facing parallel proximate surfaces and first and second facing parallel spaced surfaces defining the key hole cross-section, the proximate surfaces and spaced surfaces being parallel, the connector having first and second opposed parallel proximate surfaces, first and second opposed parallel inner spaced surfaces and first and second opposed parallel outer spaced surfaces, the first and second opposed parallel proximate surfaces and first and second opposed parallel outer spaced surfaces forming the T-shape portion, the first and second opposed parallel proximate surfaces, first and second opposed parallel inner spaced surfaces and first and second opposed parallel outer spaced surfaces being parallel, the first and second facing parallel proximate surfaces of the locking slot and the first and second opposed parallel proximate surfaces of the connector sliding against each other as the hub and connector are engaged.

19. A salt platform, comprising:
a plurality of hubs, each hub having at least one locking element;
at least one radial brace, the radial brace having first and second ends, each end having a locking element to engage a locking element in a hub to secure the radial brace and hub together, and;
further comprising a plurality of curved braces having locking elements to secure a curved brace to a hub.

* * * * *